United States Patent
Takewa et al.

(10) Patent No.: US 10,859,708 B2
(45) Date of Patent: Dec. 8, 2020

(54) SATELLITE POSITIONING SYSTEM RECEIVER CAPABLE OF DETECTING FAILURE IN RF RECEIVER UNIT INCLUDING RECEIVING ANTENNA

(71) Applicant: MITSUBISHI ELECTRIC CORPORATION, Chiyoda-ku (JP)

(72) Inventors: Tomoaki Takewa, Chiyoda-ku (JP); Wataru Tsujita, Chiyoda-ku (JP); Yoshitsugu Sawa, Chiyoda-ku (JP); Kenji Kataoka, Chiyoda-ku (JP); Tadashi Yamamoto, Chiyoda-ku (JP); Seiya Nagashima, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 372 days.

(21) Appl. No.: 15/577,167

(22) PCT Filed: May 10, 2016

(86) PCT No.: PCT/JP2016/063821
§ 371 (c)(1),
(2) Date: Nov. 27, 2017

(87) PCT Pub. No.: WO2016/199529
PCT Pub. Date: Dec. 15, 2016

(65) Prior Publication Data
US 2018/0203127 A1 Jul. 19, 2018

(30) Foreign Application Priority Data
Jun. 8, 2015 (JP) ................................ 2015-115535

(51) Int. Cl.
*G01S 19/23* (2010.01)
*G01S 19/36* (2010.01)
(Continued)

(52) U.S. Cl.
CPC ............ *G01S 19/23* (2013.01); *G01S 19/243* (2013.01); *G01S 19/36* (2013.01); *H04B 17/29* (2015.01)

(58) Field of Classification Search
CPC ......... G01S 19/23; G01S 19/243; G01S 19/36
See application file for complete search history.

(56) References Cited

U.S. PATENT DOCUMENTS

| 6,337,622 | B1 | 1/2002 | Sugano | |
|---|---|---|---|---|
| 2006/0114151 | A1* | 6/2006 | Iwami | ...................... G01S 19/22 342/357.25 |
| 2014/0062781 | A1* | 3/2014 | Mathews | .............. G01S 19/246 342/357.64 |

FOREIGN PATENT DOCUMENTS

| JP | 2000-329839 A | 11/2000 |
|---|---|---|
| JP | 2001-291133 A | 10/2001 |

(Continued)

OTHER PUBLICATIONS

International Search Report dated Aug. 16, 2016 in PCT/JP2016/063821 filed May 10, 2016.

*Primary Examiner* — Marc Anthony Armand
(74) *Attorney, Agent, or Firm* — Xsensus LLP

(57) ABSTRACT

A test signal generator generates a first test signal. A test signal transmitter transmits the first test signal. An RF receiver unit receives the first test signal and a first satellite signal through a receiving antenna, and generates a second test signal and a second satellite signal, respectively. Each of first and second demodulators calculates a correlation value between the second satellite signal and the spreading code to acquire a satellite. A first failure detector unit compares a signal intensity of the second test signal with a threshold to generate a first failure detection signal. A second failure detector compares the satellites acquired by the first and second demodulator to generate a second failure detection (Continued)

signal. A state determiner determines whether and where a failure exists, using the first and second failure detection signals.

16 Claims, 17 Drawing Sheets

(51) Int. Cl.
*G01S 19/24* (2010.01)
*H04B 17/29* (2015.01)

(56) References Cited

FOREIGN PATENT DOCUMENTS

| JP | 2003-4836 A | 1/2003 |
| JP | 2006-201151 A | 8/2006 |
| JP | 2008-247217 A | 10/2008 |

* cited by examiner

SATELLITE POSITIONING SYSTEM RECEIVER CAPABLE OF DETECTING FAILURE IN RF RECEIVER UNIT INCLUDING RECEIVING ANTENNA

TECHNICAL FIELD

The present invention relates to a receiver for use in a satellite positioning system, such as GPS (Global Positioning System).

BACKGROUND ART

A technique for a GPS receiver to conduct self-diagnoses of its failure is disclosed in, for example, Patent Document 1. The GPS receiver disclosed in Patent Document 1 combines an output signal of a pseudo-noise generator in one of a plurality of demodulator circuits, with an output signal of a carrier frequency oscillator, to generate a test signal for self-diagnosis. The GPS receiver then inputs the generated test signal to the other demodulator circuits, and compares calculated results of the other demodulator circuits with a reference value calculated in advance, thus diagnosing operations of the demodulator circuits.

CITATION LIST

Patent Documents

PATENT DOCUMENT 1: Japanese Patent Laid-open Publication No. 2003-004836

SUMMARY OF INVENTION

Technical Problem

The GPS receiver disclosed in Patent Document 1 can diagnose failures in the demodulator circuits after stages for converting signal frequency into a frequency of the intermediate frequency band, but cannot detect a failure in an RF (Radio Frequency) receiver unit, including a receiving antenna. Accordingly, there is a problem that, for example, when a failure occurs in the receiving antenna, it is not possible to distinguish whether positioning is permanently prevented by the failure in the receiver, or positioning is temporarily prevented by the degraded receiving environment, such as traveling in tunnels, or by dirt on a radome.

The present invention has been achieved in order to solve the above problems, and an object thereof is to provide a satellite positioning system receiver capable of detecting a failure in an RF receiver unit, including a receiving antenna.

Solution to Problem

A satellite positioning system receiver according to the present invention includes a test signal generator unit, a test signal transmitter unit, an RF receiver unit, a first demodulator unit, a second demodulator unit, a positioning calculator unit, a first failure detector unit, a second failure detector unit, and a state determiner unit. The test signal generator unit generates a first test signal having a frequency in an RF frequency band. The test signal transmitter unit transmits the first test signal. The RF receiver unit receives the first test signal and a first satellite signal transmitted from a satellite, through a receiving antenna, and generates a second test signal and a second satellite signal, respectively, each of the second test signal and the second satellite signal having a frequency in a baseband frequency band. The first demodulator unit calculates a first correlation value between the second satellite signal and a spreading code allocated per satellite, to acquire a satellite transmitting the first satellite signal. The second demodulator unit calculates a second correlation value between the second satellite signal and the spreading code, to acquire the satellite transmitting the first satellite signal. The positioning calculator unit calculates an own position using the first correlation value. The first failure detector unit compares signal intensity of the second test signal with a predetermined threshold, to generate a first failure detection signal. The second failure detector unit compares the satellite acquired by the first demodulator unit with the satellite acquired by the second demodulator unit, to generate a second failure detection signal. The state determiner unit determines whether and where a failure exists, using the first failure detection signal and the second failure detection signal.

Further, a satellite positioning system receiver according to the present invention includes a simulated-signal generator unit, a simulated-signal transmitter unit, an RF receiver unit, a demodulator unit, a positioning calculator unit, a first failure detector unit, a second failure detector unit, and a state determiner unit. The simulated-signal generator unit generates a first simulated signal that simulates a satellite signal transmitted from a satellite traveling at a predetermined position. The simulated-signal transmitter unit transmits the first simulated signal. The RF receiver unit receives the first simulated signal and a first satellite signal transmitted from a satellite, through a receiving antenna, and generates a second simulated signal and a second satellite signal, respectively, each of the second simulated signal and the second satellite signal having a frequency in a baseband frequency band. The demodulator unit calculates a correlation value between the second simulated signal and a spreading code allocated per satellite, to acquire a satellite simulated by the simulated-signal generator unit, and that calculates a correlation value between the second satellite signal and the spreading code allocated per satellite, to acquire a satellite transmitting the first satellite signal. The positioning calculator unit calculates an own position using the correlation value between the second satellite signal and the spreading code. The first failure detector unit compares signal intensity of the second simulated signal with a predetermined threshold, to generate a first failure detection signal. The second failure detector unit determines whether the satellite simulated by the simulated-signal generator unit is acquired by the demodulator unit, to generate a second failure detection signal. The state determiner unit determines whether and where a failure exists, using the first failure detection signal and the second failure detection signal.

Further, a satellite positioning system receiver according to the present invention includes two positioning receiver units and one state determiner unit. Each of the positioning receiver unit includes a test signal generator unit, a test signal transmitter unit, an RF receiver unit, a first demodulator unit, a second demodulator unit, a positioning calculator unit, a first failure detector unit, and a second failure detector unit. The test signal generator unit generates a first test signal having a frequency in an RF frequency band. The test signal transmitter unit transmits the first test signal. The RF receiver unit receives the first test signal and a first satellite signal transmitted from a satellite, through a receiving antenna, and generates a second test signal and a second satellite signal, respectively, each of the second test signal and the second satellite signal having a frequency in a baseband frequency band. The first demodulator unit calculates a first correlation value between the second satellite signal and a spreading code allocated per satellite, to acquire a satellite transmitting the first satellite signal. The second demodulator unit calculates a second correlation value between the second satellite signal and the spreading code, to acquire the satellite transmitting the first satellite signal. The positioning calculator unit calculates an own position using the first correlation value, and outputs a positioning-unavailability signal notifying whether the own position has been calculated. The first failure detector unit compares signal intensity of the second test signal with a predetermined threshold, to generate a first failure detection signal. The second failure detector unit compares the satellite acquired by the first demodulator unit with the satellite acquired by the second demodulator unit, to generate a second failure detection signal. The state determiner unit determines whether and where a failure exists, and when the positioning calculator unit cannot calculate the own position, determines a reason why the positioning calculator unit cannot calculate the own position, using the first failure detection signal, the second failure detection signal, and the positioning-unavailability signal which are outputted from the two positioning receiver units.

Advantageous Effects of Invention

According to the satellite positioning system receiver of the present invention, the test signal generator unit generates the first test signal. In addition, the test signal transmitter unit transmits the first test signal. In addition, the RF receiver unit receives the first test signal and the first satellite signal through the receiving antenna, and generates the second test signal and the second satellite signal, respectively. In addition, the first demodulator unit calculates the first correlation value between the second satellite signal and the spreading code to acquire the satellite. In addition, the second demodulator unit calculates the second correlation value between the second satellite signal and the spreading code, to acquire the satellite. In addition, the first failure detector unit compares the signal intensity of the second test signal with the threshold, to generate the first failure detection signal. In addition, the second failure detector unit compares the satellite acquired by the first demodulator unit with the satellite acquired by the second demodulator unit, to generate the second failure detection signal. In addition, the state determiner unit determines whether and where a failure exists, using the first failure detection signal and the second failure detection signal. Accordingly, it is possible to detect a failure in the RF receiver unit including the receiving antenna.

Further, according to the satellite positioning system receiver of the present invention, the simulated-signal generator unit generates the first simulated signal that simulates the satellite signal transmitted from the satellite traveling at the predetermined position. In addition, the simulated-signal transmitter unit transmits the first simulated signal. In addition, the RF receiver unit receives the first simulated signal and the first satellite signal through the receiving antenna, and generates the second simulated signal and the second satellite signal, respectively. In addition, the demodulator unit calculates the correlation value between the second simulated signal and the spreading code, to acquire the satellite simulated by the simulated-signal generator unit, and calculates the correlation value between the second satellite signal and the spreading code, to acquire the satellite transmitting the first satellite signal. In addition, the positioning calculator unit calculates the own position using the correlation value between the second satellite signal and the spreading code. In addition, the first failure detector unit compares the signal intensity of the second simulated signal with the threshold, to generate the first failure detection signal. In addition, the second failure detector unit determines whether the satellite simulated by the simulated-signal generator unit is acquired by the demodulator unit, to generate the second failure detection signal. In addition, the state determiner unit determines whether and where a failure exists, using the first failure detection signal and the second failure detection signal. Accordingly, it is possible to detect a failure in the RF receiver unit including the receiving antenna.

Further, the satellite positioning system receiver according to the present invention includes the two positioning receiver units and the one state determiner unit. The state determiner unit determines whether and where a failure exists, and when the positioning calculator unit cannot calculate the own position, determines the reason why the positioning calculator unit cannot calculate the own position, using the first failure detection signal, the second failure detection signal, and the positioning-unavailability signal which are outputted from the two positioning receiver units. Accordingly, it is possible to detect a failure in the RF receiver unit including the receiving antenna. In addition, when the positioning calculator unit cannot calculate the own position, it is possible to determine the reason why the positioning calculator unit cannot calculate the own position.

DESCRIPTION OF EMBODIMENTS

First Embodiment

Figure 1:
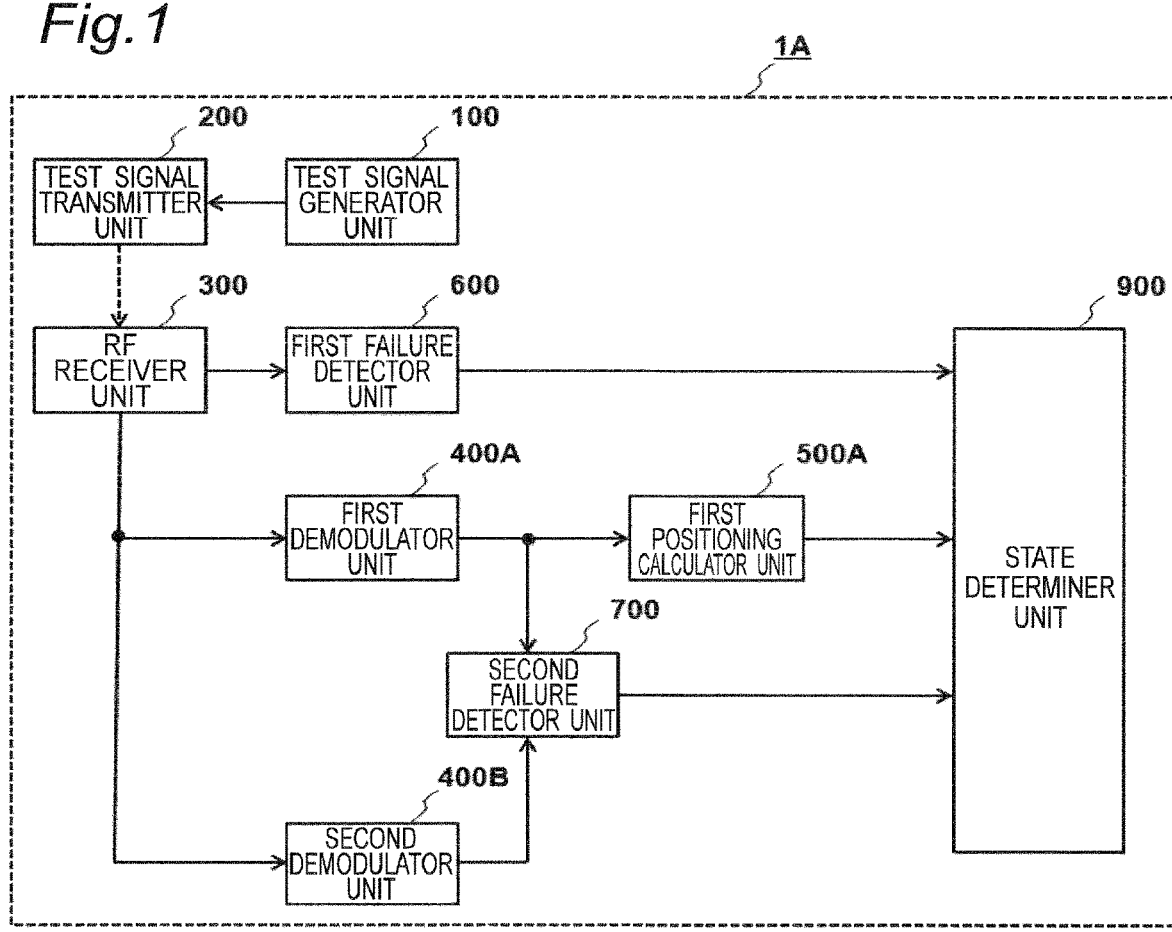
FIG. 1 shows a configuration of a satellite positioning system receiver according to a first embodiment of the present invention.

FIG. 1 shows a configuration of a satellite positioning system receiver 1A according to a first embodiment of the present invention. The satellite positioning system receiver 1A according to the present embodiment includes a test signal generator unit 100, a test signal transmitter unit 200, an RF receiver unit 300, a first demodulator unit 400A, a second demodulator unit 400B, a first positioning calculator unit 500A, a first failure detector unit 600, a second failure detector unit 700, and a state determiner unit 900. It is noted that in the satellite positioning system receiver 1A according to the present embodiment, the demodulator units are configured as a dual system including the first demodulator unit 400A and the second demodulator unit 400B.

The test signal generator unit 100 generates a first test signal having a frequency in an RF frequency band (high frequency band). The RF frequency band is a frequency band used for radio transmission of signals from satellites. The test signal transmitter unit 200 transmits the first test signal to the RF receiver unit 300. Referring to FIG. 1, an arrow of a broken line from the test signal transmitter unit 200 to the RF receiver unit 300 indicates that the first test signal is radio-transmitted from the test signal transmitter unit 200 to the RF receiver unit 300. The RF receiver unit 300 receives the first test signal, and a first satellite signal transmitted as radio waves from a satellite, and generates a second satellite signal and a second test signal, respectively, from a mixed signal of the first test signal and the first satellite signal, each of the second satellite signal and the second test signal having a frequency in the baseband frequency band.

The first demodulator unit 400A calculates a correlation value between the second satellite signal and a spreading code allocated per satellite, to acquire a satellite transmitting the first satellite signal. In addition, the first demodulator unit 400A outputs the calculated correlation value as a first correlation value. In a manner similar to that of the first demodulator unit 400A, the second demodulator unit 400B calculates a correlation value between the second satellite signal and the spreading code allocated per satellite, to acquire the satellite transmitting the first satellite signal. In addition, the second demodulator unit 400B outputs the calculated correlation value as a second correlation value. The first positioning calculator unit 500A calculates a first own position indicating the position of the satellite positioning system receiver 1A itself, based on the first correlation value. Although the satellite positioning system receiver 1A according to the present embodiment is configured to calculate the first own position based on the first correlation value, the satellite positioning system receiver 1A may be configured to calculate the first own position based on the second correlation value.

The first failure detector unit 600 compares signal intensity of the second test signal in a predetermined frequency band with a threshold, to generate a first failure detection signal. The threshold is determined in advance. In addition, the frequency band used for generating the first failure detection signal is determined according to the frequency band of the first test signal. That is, the first failure detector unit 600 compares signal intensity of a component of the second test signal in the predetermined frequency band with the threshold, to generate the first failure detection signal. The second failure detector unit 700 compares the satellite acquired by the first demodulator unit 400A with the satellite acquired by the second demodulator unit 400B, to generate a second failure detection signal. The state determiner unit 900 determines whether and where a failure exists in the satellite positioning system receiver 1A, based on the first failure detection signal and the second failure detection signal. An operation of the satellite positioning system receiver 1A according to the present embodiment is described below in further detail.

Figure 2:
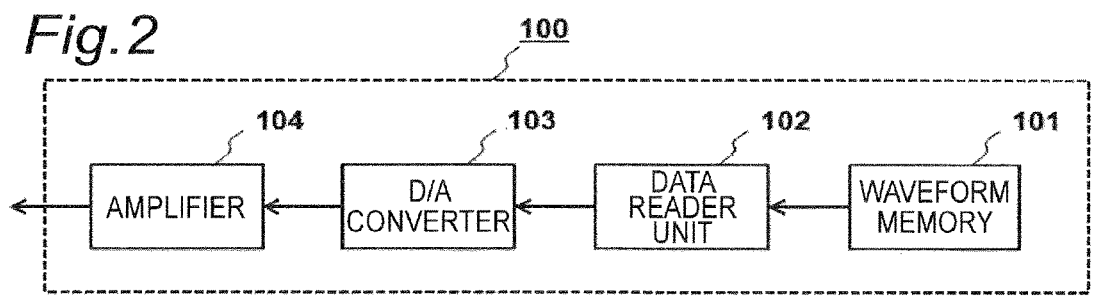
FIG. 2 shows an exemplary configuration of a test signal generator unit in the satellite positioning system receiver according to the first embodiment of the present invention.

At first, the test signal generator unit 100 is described. FIG. 2 shows an exemplary configuration of the test signal generator unit 100 in the satellite positioning system receiver 1A according to the first embodiment of the present invention. The test signal generator unit 100 includes a waveform memory 101, a data reader unit 102, a D/A converter 103, and an amplifier 104. The waveform memory 101 stores the waveform of the first test signal. That is, the waveform memory 101 stores information about magnitude of the first test signal at each time in time order. It is noted that "time" as referred to herein means the relative time from when starting to output the first test signal. The first test signal is periodic, and it is only necessary to store a waveform for one period in the waveform memory 101. The data reader unit 102 reads the magnitude of the first test signal from the waveform memory at a predetermined time interval, and outputs the magnitude of the first test signal as a continuous signal waveform to the D/A converter. The data reader unit 102 includes, for example, an electronic circuit. As another example, the data reader unit 102 is embodied by executing programs stored in a memory on a processor.

The data reader unit 102 reads data stored in the waveform memory 101 at an appropriate time interval so that the first test signal has a frequency in the RF frequency band. The D/A converter 103 converts the data read from the data reader unit 102 into an analog signal. The amplifier 104 amplifies the analog signal outputted from the D/A converter 103, to a predetermined signal level, and outputs the amplified signal as the first test signal. By operating as described above, the test signal generator unit 100 generates the first test signal having the frequency in the RF frequency band. The first test signal has, for example, a sinusoidal waveform with a frequency f1. Alternatively, the first test signal may have a waveform with a center frequency f1 and a bandwidth 2×Δf1. Such a waveform can be represented by a Sinc function or a Gaussian function.

It is noted that the frequency or frequency band of the first test signal is set so as not to overlap the signal band of a positioning satellite to be used. If GPS is used for the positioning satellite, then the signal band of a satellite signal is obtained by adding a Doppler component due to the movement in the relative position between the positioning satellite and the receiver, to a (1575.42±1.023) MHz band, i.e., a band for a carrier frequency directly spread by a 1.023 MHz code. Since the Doppler component for GPS is at most ±10 kHz, f1 and Δf1 are set so as to satisfy the following mathematical expression (1) or (2).

[Mathematical Expression 1]

$$(1575.42+1.033) \text{ MHz} < f1 - \Delta f1 \quad (1)$$

[Mathematical Expression 2]

$$f1 + \Delta f1 < (1575.42 - 1.033) \text{ MHz} \quad (2)$$

Next, the test signal transmitter unit 200 is described. The first test signal generated by the test signal generator unit 100 is outputted to the test signal transmitter unit 200. The test signal transmitter unit 200 transmits the first test signal to the RF receiver unit 300. The test signal transmitter unit 200 serves as a transmitting antenna. The test signal transmitter unit 200 may include only signal lines. In such a case, the test signal transmitter unit 200 can transmit the first test signal to the RF receiver unit 300 by generating weak electrical coupling between the signal line and a receiving antenna included in the RF receiver unit 300.

The test signal transmitter unit 200 is fixed close to the receiving antenna included in the RF receiver unit 300. When the receiving antenna is installed inside a radome, the test signal transmitter unit 200 is also installed inside the radome. Consequently, even when dirt adheres to the radome, the first test signal can be transmitted to the receiving antenna. When the test signal transmitter unit 200 includes signal lines, one end of the signal line is fixed close to the receiving antenna included in the RF receiver unit 300. By using such an arrangement, a small electrostatic capacity component is formed between the signal line and the receiving antenna, resulting in weak coupling between the signal line and the receiving antenna. Therefore, the test signal transmitter unit 200 can transmit the first test signal to the receiving antenna.

Figure 3:
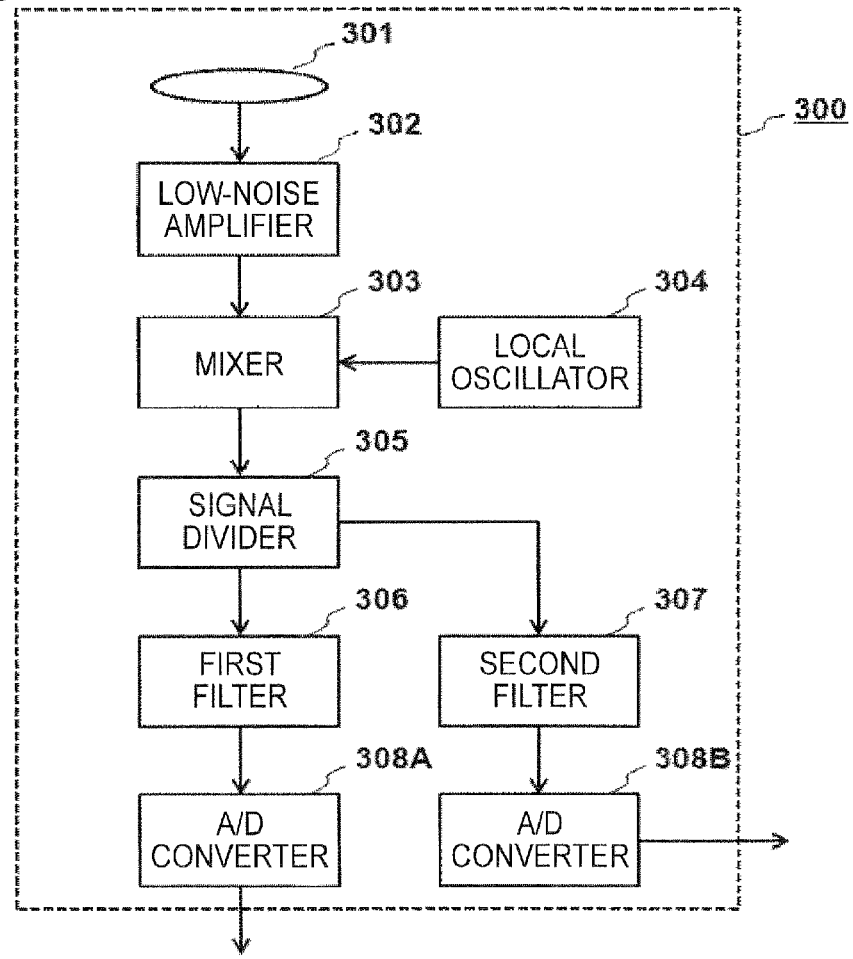
FIG. 3 shows an exemplary configuration of an RF receiver unit in the satellite positioning system receiver according to the first embodiment of the present invention.

Next, the RF receiver unit 300 is described. FIG. 3 shows an exemplary configuration of the RF receiver unit 300 in the satellite positioning system receiver 1A according to the first embodiment of the present invention. The RF receiver unit 300 includes a receiving antenna 301, a low-noise amplifier 302, a mixer 303, a local oscillator 304, a signal divider 305, a first filter 306, a second filter 307, and A/D converters 308A and 308B. The receiving antenna 301 simultaneously receives the first satellite signal transmitted from a positioning satellite, and the first test signal transmitted from the test signal transmitter unit 200. The low-noise amplifier 302 amplifies a mixed signal of the first satellite signal and the first test signal which are received through the receiving antenna 301. The mixer 303 mixes the signal amplified by the low-noise amplifier 302 with a sinusoidal wave generated by the local oscillator 304. Consequently, the signal in the RF frequency band is converted into a signal in the baseband frequency band. The signal converted into the baseband frequency band is a mixed signal of the second satellite signal which is obtained by converting the first satellite signal into the baseband frequency band, and the second test signal which is obtained by converting the first test signal into the baseband frequency band.

The signal divider 305 divides the signal converted into the baseband frequency band, into two signals, and outputs one signal to the first filter 306, and the other signal to the second filter 307. The first filter 306 extracts and outputs the second satellite signal from the mixed signal of the second satellite signal and the second test signal. The second filter 307 extracts and outputs the second test signal from the mixed signal of the second satellite signal and the second test signal. The second satellite signal outputted from the first filter 306 is converted into a digital signal by the A/D converter 308A, and the converted digital signal is outputted to the first demodulator unit 400A and the second demodulator unit 400B. On the other hand, the second test signal outputted from the second filter 307 is converted into a digital signal by the A/D converter 308B, and the converted digital signal is outputted to the first failure detector unit 600.

The passbands of the first filter 306 and the second filter 307 are determined according to the frequency f2 of the sinusoidal wave generated by the local oscillator 304, and the center frequency f1 and the bandwidth 2×Δf1 of the first test signal. For example, assuming that f2 is 1575.42 MHz, which is equal to the carrier frequency of a GPS L1 signal, a low-pass filter having a cut-off frequency of 1.023 MHz can be used for the first filter 306. On the other hand, a bandpass filter having a passband in the frequency range from (f1−Δf1−f2) to (f1+Δf1−f2) can be used for the second filter 307.

Figure 4:
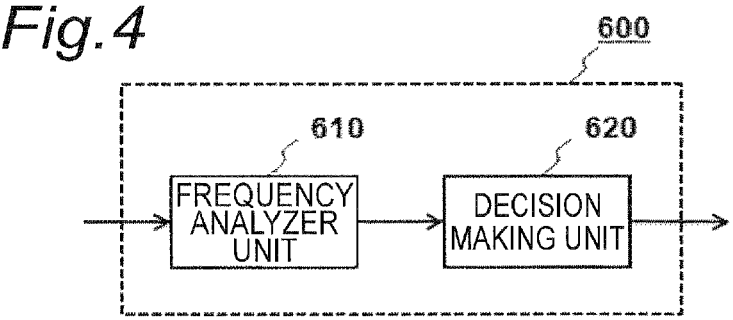
FIG. 4 shows an exemplary configuration of a first failure detector unit in the satellite positioning system receiver according to the first embodiment of the present invention.

Next, the first failure detector unit 600 is described. FIG. 4 shows an exemplary configuration of the first failure detector unit 600 in the satellite positioning system receiver 1A according to the first embodiment of the present invention. The first failure detector unit 600 includes a frequency analyzer unit 610 and a decision making unit 620, and analyzes the frequency of the second test signal outputted from the RF receiver unit 300 to diagnose a failure in the RF receiver unit 300. The frequency analyzer unit 610 performs spectrum analysis on the second test signal outputted from the RF receiver unit 300. When the RF receiver unit 300 including the receiving antenna 301 operates normally, the second test signal is a signal whose band is converted from the RF frequency band into the baseband frequency band. The decision making unit 620 determines that the RF receiver unit 300 is normal, when magnitude of the frequency component of the second test signal in a predetermined band exceeds a predetermined threshold. The predetermined band is determined according to the frequency band of the first test signal.

For example, in a case where a sinusoidal wave having the frequency f1 is used as the first test signal, and a sinusoidal wave having the frequency f2 is generated by the local oscillator 304, if the RF receiver unit 300 operates normally, the frequency of the second test signal is (f1-f2). Thus, the decision making unit 620 can diagnose a failure in the RF receiver unit 300 by comparing the spectrum component of the frequency (f1-f2) with the predetermined threshold. The decision making unit 620 outputs the first failure detection signal to the state determiner unit 900, the first failure detection signal indicating whether the RF receiver unit 300 is in a normal state or a failure state. the decision making unit 620 sets the first failure detection signal to "O", when determining that the RF receiver unit 300 is in the normal state. On the other hand, the decision making unit 620 sets the first failure detection signal to "1", when determining that the RF receiver unit 300 is in the failure state.

Figure 5:
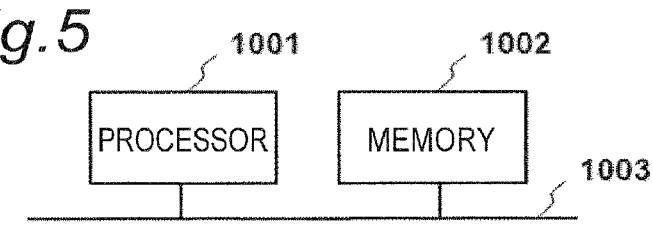
FIG. 5 shows an exemplary configuration in a case where a part of functions of the satellite positioning system receiver according to the present invention is implemented by a processor and a memory.

The frequency analyzer unit 610 and the decision making unit 620 include, for example, electronic circuits. As another example, the frequency analyzer unit 610 and the decision making unit 620 are embodied by executing programs stored in a memory on a processor. FIG. 5 shows an exemplary configuration in a case where a part of functions of the satellite positioning system receiver according to the present invention, such as the frequency analyzer unit 610 or the decision making unit 620, is implemented by a processor 1001 and a memory 1002. The processor 1001 reads and executes a program stored in the memory 1002 through a data bus 1003. It is noted that, blocks other than the frequency analyzer unit 610 or the decision making unit 620 may be implemented using the processor 1001 and the memory 1002, and in this case, the blocks may be implemented in a similar configuration.

It is noted that the first failure detector unit 600 does not necessarily include the frequency analyzer unit 610. The first failure detector unit 600 compares the signal intensity of the second test signal in the predetermined frequency band with the threshold, to generate the first failure detection signal. In this case, the predetermined frequency band is determined according to the frequency band of the first test signal, for example, (f1-f2) as mentioned above. Accordingly, when the passband of the second filter 307 included in the RF receiver unit 300 is substantially limited to the predetermined frequency band used for generating the first failure detection signal, the first failure detector unit 600 does not need to include the frequency analyzer unit 610. On the other hand, when the passband of the second filter 307 is a wide frequency band, it is preferable that the first failure detector unit 600 includes the frequency analyzer unit 610.

Figure 6:
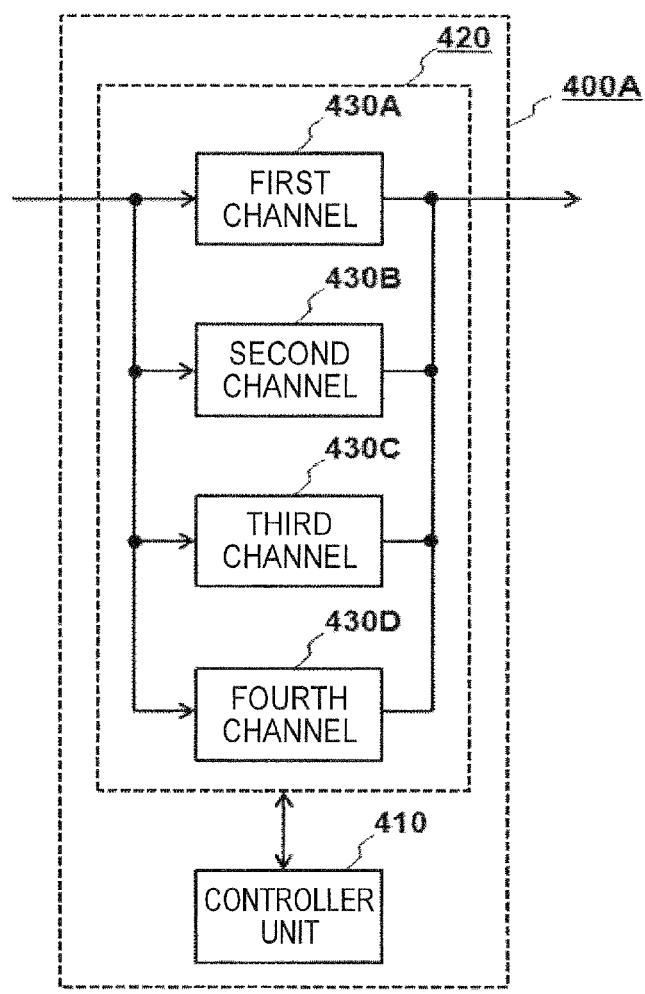
FIG. 6 shows an exemplary configuration of a first demodulator unit in the satellite positioning system receiver according to the first embodiment of the present invention.

Next, the first demodulator unit 400A and the second demodulator unit 400B are described. FIG. 6 shows an exemplary configuration of the first demodulator unit 400A in the satellite positioning system receiver 1A according to the first embodiment of the present invention. It is noted that the second demodulator unit 400B is also configured in a manner similar to that of the first demodulator unit 400A. The first demodulator unit 400A includes a controller unit 410 and a demodulator circuit 420. The controller unit 410 is embodied by executing programs stored in a memory on a processor, and generates a control signal for controlling operation of the demodulator circuit 420. The configuration based on the memory and the processor is similar to that of FIG. 5. The demodulator circuit 420 includes n (n is an integer) channels so as to be capable of simultaneously processing signals from a plurality of satellites. FIG. 6 shows an example in which the demodulator circuit 420 includes four channels, that is, a first channel 430A, a second channel 430B, a third channel 430C, and a fourth channel 430D. The second satellite signal outputted from the RF receiver unit 300 is inputted to each of the first channel 430A, the second channel 430B, the third channel 430C, and the fourth channel 430D.

Figure 7:
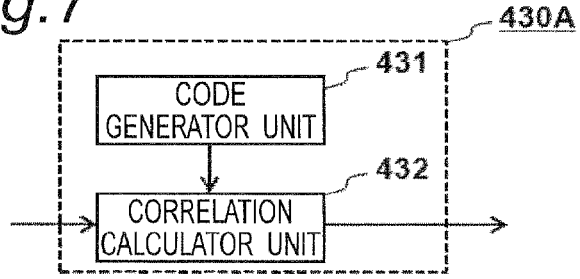
FIG. 7 shows an exemplary configuration of a first channel in the satellite positioning system receiver according to the first embodiment of the present invention.

FIG. 7 shows an exemplary configuration of the first channel 430A in the satellite positioning system receiver 1A according to the first embodiment of the present invention. It is noted that the second channel 430B, the third channel 430C, and the fourth channel 430D is also configured in a manner similar to that of the first channel 430A. The first channel 430A includes a code generator unit 431 and a correlation calculator unit 432. The code generator unit 431 generates one of spreading codes that differ from satellite to satellite, according to a control signal from the controller unit 410, and outputs the spreading code to the correlation calculator unit 432. The correlation calculator unit 432 performs multiplication and addition operations on the second satellite signal and the spreading code generated by the code generator unit 431, to calculate a correlation value between the second satellite signal and the spreading code.

The first demodulator unit 400A and the second demodulator unit 400B are described in further detail. The processes performed by the first demodulator unit 400A and the second demodulator unit 400B include a satellite acquisition process of searching for and acquiring a satellite having transmitted the first satellite signal received by the receiver, and a satellite tracking process of keeping track of the signal from the acquired satellite. Acquiring a satellite herein means a state in which a satellite signal transmitted from a satellite is being received. In the satellite acquisition process, the controller unit 410 specifies a satellite to be processed by each channel. The satellite is specified using an ID number of the satellite, or the like. The code generator unit 431 in each channel generates a spreading code signal corresponding to the satellite specified by the controller unit 410. The correlation calculator unit 432 calculates a correlation value between the second satellite signal and the spreading code signal.

The calculated correlation value is also inputted to the controller unit 410. The controller unit 410 changes each of the frequency and phase of the spreading code signal, and the frequency and phase of a carrier signal, within a predetermined range, to search for conditions for maximizing the correlation value. The carrier signal herein is a sinusoidal wave generated by the local oscillator 304 included in the RF receiver unit 300. For ease of illustration, a control signal line from the controller unit 410 to the RF receiver unit 300 is not shown. In addition, the correlation calculator unit 432 calculates the correlation value as a digital signal sequence, and maximizing the correlation value means maximizing the amplitude or signal level of the calculated digital signal sequence.

When the amplitude or signal level of the correlation value exceeds a predetermined threshold in the searched conditions, the controller unit 410 determines that the specified satellite is acquired, and proceeds to the signal tracking process. In the signal tracking process, the controller unit 410 continuously changes the frequency and phase of the spreading code signal, and the frequency and phase of the carrier signal, so that these frequencies and phases follow the Doppler shift. In addition, the correlation calculator unit 432 in each channel calculates the correlation value between the second satellite signal and the spreading code, and outputs the correlation value, together with identification information of the satellite acquired by each channel, to the first positioning calculator unit 500A. The correlation calculator unit 432 in each channel also outputs the identification information of the satellite acquired by each channel, to the second failure detector unit 700. An ID number of a satellite or the like is used for the identification information of the acquired satellite. It is noted that, when no satellite is acquired, the correlation calculator unit 432 in each channel outputs a signal indicating that no satellite is acquired.

Next, the second failure detector unit 700 is described. The second failure detector unit 700 diagnoses a failure in the first demodulator unit 400A and the second demodulator unit 400B. The second failure detector unit 700 compares the satellite acquired by the first demodulator unit 400A with the satellite acquired by the second demodulator unit 400B, to diagnose a failure. Since the first demodulator unit 400A and the second demodulator unit 400B are configured as the dual system, the second failure detector unit 700 can determine whether the demodulator units operate normally by comparing and checking the acquired satellites.

When all the ID numbers of the satellites acquired by the first demodulator unit 400A and the second demodulator unit 400B are identical to each other, the second failure detector unit 700 determines that the first demodulator unit 400A and the second demodulator unit 400B are in the normal state, sets the second failure detection signal to "0", and outputs the second failure detection signal. On the other hand, when at least one of the ID numbers of the satellites acquired by the first demodulator unit 400A and the second demodulator unit 400B are not identical to each other, the second failure detector unit 700 determines that at least one of the first demodulator unit 400A and the second demodulator unit 400B is in the failure state, sets the second failure detection signal to "1", and outputs the second failure detection signal.

Since a plurality of satellites are typically acquired by the first demodulator unit 400A and the second demodulator unit 400B, the second failure detector unit 700 determines whether combinations of the acquired satellites are identical to each other. It is noted that, when no satellite is acquired by both the first demodulator unit 400A and the second demodulator unit 400B, the comparison results in being identical, and therefore, the second failure detector unit 700 sets the second failure detection signal to "0", and outputs the second failure detection signal. The second failure detection signal is inputted to the state determiner unit 900. The second failure detector unit 700 includes, for example, an electronic circuit. As another example, the second failure detector unit 700 is embodied by executing programs stored in a memory on a processor. The configuration of the memory and the processor is similar to that of FIG. 5.

Here, modified embodiments of the satellite positioning system receiver 1A according to the present embodiment are described. At first, a first modified embodiment is as follows. For example, when there is a satellite that is acquired by the first demodulator unit 400A, but is not acquired by the second demodulator unit 400B (referred to as "N-th satellite"), the second failure detector unit 700 transmits a notification signal to the second demodulator unit 400B. When receiving the notification signal, the second demodulator unit 400B reacquires the N-th satellite in a channel different from the channel used when acquiring the N-th satellite last time. Consequently, when the N-th satellite is acquired, the second failure detector unit 700 determines that only the channel used when acquiring the N-th satellite last time is in the failure state. The first modified embodiment has been described above. Next, a second modified embodiment is as follows. In the satellite positioning system receiver 1A as shown in FIG. 1, the demodulator units are configured as the dual system including the first demodulator unit 400A and the second demodulator unit 400B. However, the demodulator units may be configured as a multi system including three or more units. In such a case, the second failure detector unit 700 performs a majority decision, and determines that a demodulator unit having outputted a minority result is in the failure state. The second modified embodiment has been described above.

Next, the first positioning calculator unit 500A is described. The first positioning calculator unit 500A demodulates a navigation message based on the correlation value outputted from the first demodulator unit 400A, and the identification information of the acquired satellite, and calculates an own position, i.e., the position of the receiver itself. The first positioning calculator unit 500A decodes the navigation message from the correlation value corresponding to the acquired satellite, and calculates the own position using the signal's transmitted time and the satellite's orbit information obtained therefrom. It is noted that, when the first demodulator unit 400A is acquiring four or more satellites, the first positioning calculator unit 500A sets a positioning-unavailability signal to "0", and outputs the positioning-unavailability signal. When less than four satellites are acquired, the first positioning calculator unit 500A sets the positioning-unavailability signal to "1", and outputs the positioning-unavailability signal.

When the positioning-unavailability signal is "1", it indicates that the first positioning calculator unit 500A cannot calculate the own position. The first positioning calculator unit 500A includes, for example, an electronic circuit. As another example, the first positioning calculator unit 500A is embodied by executing programs stored in a memory on a processor. The configuration of the memory and the processor is similar to that of FIG. 5. In this case, when the first demodulator unit 400A is acquiring five or more satellites, the first positioning calculator unit 500A selects four satellites among the acquired satellites, and calculates the own position using information of the selected satellites.

Figure 8:
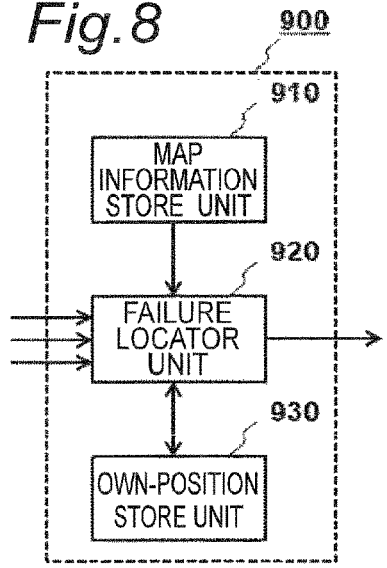
FIG. 8 shows an exemplary configuration of a state determiner unit in the satellite positioning system receiver according to the first embodiment of the present invention.

Finally, the state determiner unit 900 is described. The state determiner unit 900 determines whether and where a failure exists in the satellite positioning system receiver 1A, based on the first failure detection signal and the second failure detection signal. In addition, the state determiner unit 900 also has a function to estimate a reason why the positioning-unavailability signal from the first positioning calculator unit 500A is "1", when the positioning-unavailability signal is "1" even though it is determined that there is no failure in the satellite positioning system receiver 1A. FIG. 8 shows an exemplary configuration of the state determiner unit 900 in the satellite positioning system receiver 1A according to the first embodiment of the present invention. The state determiner unit 900 includes a map information store unit 910, a failure locator unit 920, and an own-position store unit 930. The map information store unit 910 and the own-position store unit 930 are, for example, memories. The failure locator unit 920 includes, for example, an electronic circuit. As another example, the failure locator unit 920 is embodied by executing programs stored in a memory on a processor. The configuration of the memory and the processor is similar to that of FIG. 5.

The first failure detection signal and the second failure detection signal are inputted to the failure locator unit 920. The failure locator unit 920 determines whether and where a failure exists in the satellite positioning system receiver 1A, according to Table 1. When both the first failure detection signal and the second failure detection signal are "0", the failure locator unit 920 determines that there is no failure location in the satellite positioning system receiver 1A (Types 1 to 3 in Table 1). When the first failure detection signal is "0", and the second failure detection signal is "1", the failure locator unit 920 determines that there is a failure in the first demodulator unit 400A or the second demodulator unit 400B (Type 4 in Table 1). When the first failure detection signal is "1", the failure locator unit 920 determines that there is a failure in the RF receiver unit 300 (Types 5 and 6 in Table 1).

Further, the own position obtained by the first positioning calculator unit 500A, the positioning-unavailability signal, and map information stored in the map information store unit 910 are also inputted to the failure locator unit 920. The failure locator unit 920 uses such information to determine a reason why the first positioning calculator unit 500A cannot calculate the own position even though there is no failure in the satellite positioning system receiver 1A. One possible reason is that radio waves from satellites are blocked due to degraded receiving environment of the receiving antenna 301. If the receiving antenna 301 is located in tunnels or behind buildings, the receiving environment degrades. Another possible reason is radio waves are blocked due to dirt adhering to a radome part of the receiving antenna 301.

Degraded receiving environment herein means that the receiving antenna 301 is currently positioned where the radio waves from satellites hardly arrive at the receiving antenna 301. In this case, if the satellite positioning system receiver 1A moves, the satellite positioning system receiver 1A can possibly calculate the own position. On the other hand, when dirt adheres to the radome part of the receiving antenna 301, if the adhering dirt is removed, the satellite positioning system receiver 1A can possibly calculate the own position.

When a traveling path is fixed like railways, it is possible to identify, in advance, positions where radio waves are blocked by tunnels, buildings, and the like. The map information stored in the map information store unit 910 includes information of such radio-wave blocking positions. When the satellite positioning system receiver 1A is close to the radio-wave blocking position, radio waves are blocked. While the positioning-unavailability signal is "0", the failure locator unit 920 continuously updates the own position stored in the own-position store unit 930, to the latest information. When the positioning-unavailability signal becomes "1", the failure locator unit 920 checks whether the own position stored in the own-position store unit 930 is within a predetermined range from the radio-wave blocking position indicated by the map information.

When the own position is within the predetermined range from the radio-wave blocking position, the failure locator unit 920 determines that the receiving environment degrades (Type 2 in Table 1). When the own position is out of the predetermined range from the radio-wave blocking position, the failure locator unit 920 determines that dirt adheres to the radome of the antenna (Type 3 in Table 1). It is noted that, when all of the first failure detection signal, the second failure detection signal, and the positioning-unavailability

TABLE 1

| TYPE | FIRST FAILURE DETECTION SIGNAL | SECOND FAILURE DETECTION SIGNAL | POSITIONING-UNAVAILABILITY SIGNAL | MAP INFORMATION | DECISION RESULT |
| --- | --- | --- | --- | --- | --- |
| 1 | 0 | 0 | 0 | — | NO FAILURE LOCATION (NORMAL) |
| 2 | 0 | 0 | 1 | WITHIN PREDETERMINED RANGE | NO FAILURE LOCATION (DEGRADED RECEIVING ENVIRONMENT) |
| 3 | 0 | 0 | 1 | OUT OF PREDETERMINED RANGE | NO FAILURE LOCATION (DIRT ON ANTENNA RADOME) |
| 4 | 0 | 1 | — | — | FAILURE IN DEMODULATOR UNIT |
| 5 | 1 | 0 | — | — | FAILURE IN RF RECEIVER UNIT |
| 6 | 1 | 1 | — | — | FAILURE IN RF RECEIVER UNIT | signal are "0", the failure locator unit 920 determines that the satellite positioning system receiver 1A is normal (Type 1 in Table 1).

As described above, in the satellite positioning system receiver 1A according to the present embodiment, the test signal generator unit 100 generates the first test signal. In addition, the test signal transmitter unit 200 transmits the first test signal. In addition, the RF receiver unit 300 receives the first test signal and the first satellite signal through the receiving antenna 301, and generates the second test signal and the second satellite signal, respectively. In addition, the first demodulator unit 400A calculates the first correlation value between the second satellite signal and the spreading code, to acquire a satellite. In addition, the second demodulator unit 400B calculates the second correlation value between the second satellite signal and the spreading code, to acquire a satellite. In addition, the first failure detector unit 600 compares the signal intensity of the second test signal in the frequency band determined according to the frequency band of the first test signal, with the threshold, to generate the first failure detection signal. In addition, the second failure detector unit 700 compares the satellite acquired by the first demodulator unit with the satellite acquired by the second demodulator unit, to generate the second failure detection signal. In addition, the state determiner unit 900 determines whether and where a failure exists, using the first failure detection signal and the second failure detection signal. Accordingly, it is possible to also detect a failure in the RF receiver unit, and improve the capability of detecting failures.

In addition, according to the satellite positioning system receiver 1A of the present embodiment, when there is a failure in the satellite positioning system receiver 1A, it is possible to reliably detect whether and where the failure exists. In addition, according to the satellite positioning system receiver 1A of the present embodiment, by checking the map information and the own position, it is possible to determine a reason why the own position cannot be positioned, when the own position cannot be positioned even though there is no failure in the satellite positioning system receiver 1A. More specifically, according to the satellite positioning system receiver 1A of the present embodiment, it is possible to determine whether positioning is not possible due to degraded receiving environment of the receiving antenna 301, or due to dirt adhering to the radome of the receiving antenna 301. As a result, the satellite positioning system receiver 1A according to the present embodiment is available for a system requiring high reliability, such as a railway safety apparatus and automatic traveling. In addition, the test signal generator unit 100 generates the test signal in the frequency band not overlapping the frequency band of the satellite signal, and thus, it is possible to simultaneously perform ordinary positioning and failure detection. In addition, if the waveform of the first test signal is a sinusoidal wave having a single frequency, it is possible to simplify the configuration of the test signal generator unit 100.

Second Embodiment

Figure 9:
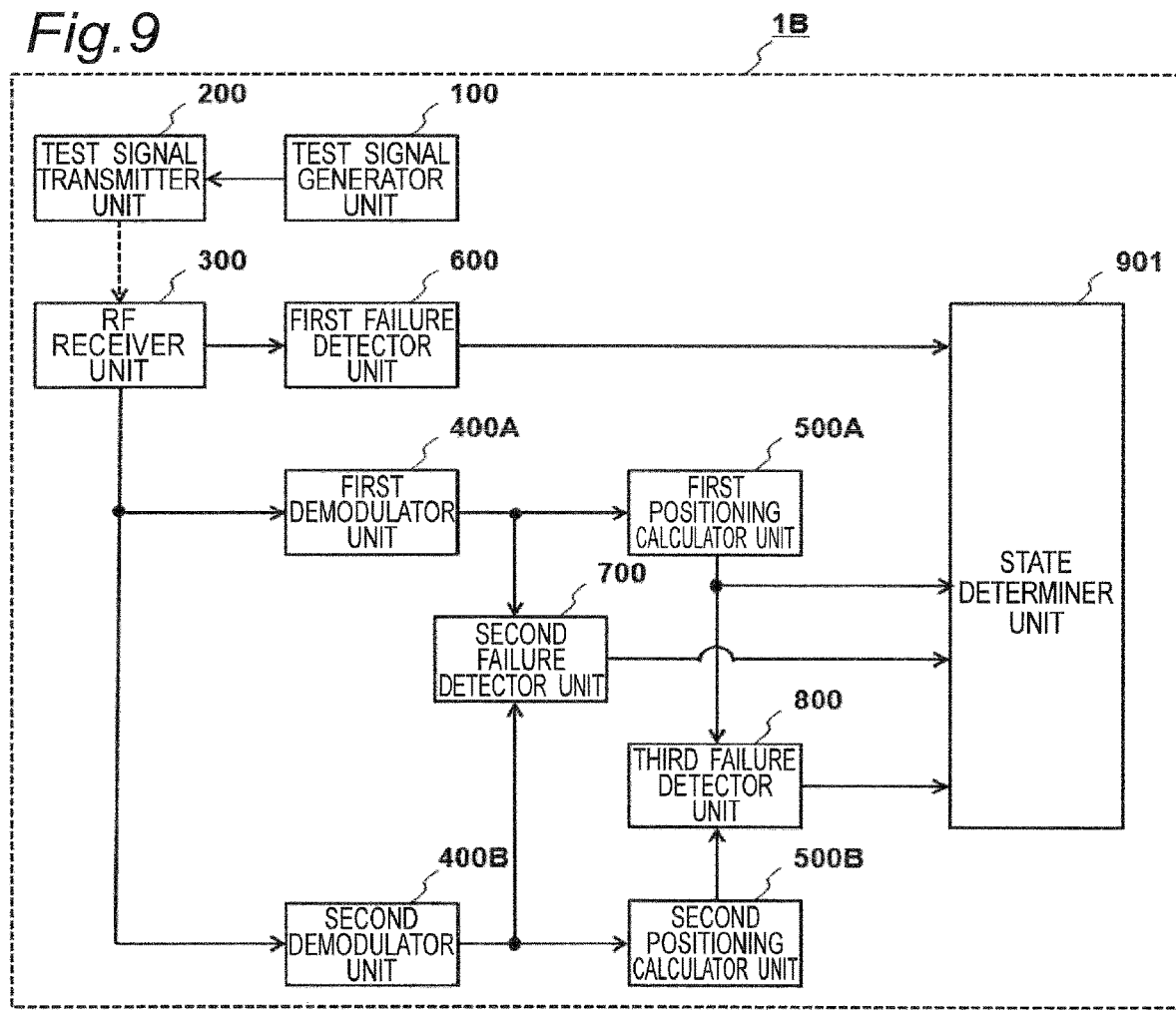
FIG. 9 shows a configuration of a satellite positioning system receiver according to a second embodiment of the present invention.

In the satellite positioning system receiver according to the first embodiment, the demodulator units are configured as the dual system. In contrast, according to a satellite positioning system receiver of the present embodiment, positioning calculator units are also configured as a dual system, and thus, it is possible to determine whether a failure exists in the positioning calculator unit. FIG. 9 shows a configuration of a satellite positioning system receiver 1B according to a second embodiment of the present invention. The satellite positioning system receiver 1B according to the present embodiment is different from the satellite positioning system receiver 1A as shown in FIG. 1 in the following two points. The first difference is that the satellite positioning system receiver 1B according to the present embodiment includes a second positioning calculator unit 500B and a third failure detector unit 800. The second difference is that operation of a state determiner unit 901 as shown in FIG. 9 is different from the operation of the state determiner unit 900 as shown in FIG. 1. It is noted that constituent elements similar to those of the satellite positioning system receiver 1A as shown in FIG. 1 are denoted by the same reference signs, and their descriptions are omitted.

At first, the second positioning calculator unit 500B is described. The second positioning calculator unit 500B has the same configuration as that of the first positioning calculator unit 500A. However, the first positioning calculator unit 500A calculates a first own position using information outputted from the first demodulator unit 400A, whereas the second positioning calculator unit 500B calculates a second own position using information outputted from the second demodulator unit 400B. The positioning calculator units are configured as a dual system including the first positioning calculator unit 500A and the second positioning calculator unit 500B.

Next, the third failure detector unit 800 is described. The third failure detector unit 800 compares the first own position outputted from the first positioning calculator unit 500A with the second own position outputted from the second positioning calculator unit 500B, to generate a third failure detection signal. The third failure detector unit 800 determines whether a failure exists in the first positioning calculator unit 500A or the second positioning calculator unit 500B, according to the comparison result of the first own position and the second own position. When the first own position is the same with the second own position, the third failure detector unit 800 determines that there is no failure in the first positioning calculator unit 500A nor the second positioning calculator unit 500B, sets the third failure detection signal to "0", and outputs the third failure detection signal to the state determiner unit 901. On the other hand, when the first own position is not the same with the second own position, the third failure detector unit 800 determines that there is a failure in the first positioning calculator unit 500A or the second positioning calculator unit 500B, sets the third failure detection signal to "1", and outputs the third failure detection signal to the state determiner unit 901.

It is noted that, when the positioning-unavailability signal from the first positioning calculator unit 500A or the second positioning calculator unit 500B is "1", the first own position or the second own position cannot be obtained. In this case, the third failure detector unit 800 operates as follows. When the positioning-unavailability signal from one of the first positioning calculator unit 500A and the second positioning calculator unit 500B is "1", and the positioning-unavailability signal from the other is "0", the third failure detector unit 800 sets the third failure detection signal to "1", and outputs the third failure detection signal to the state determiner unit 901. In addition, when the positioning-unavailability signals from both the first positioning calculator unit 500A and the second positioning calculator unit 500B are "1", the third failure detector unit 800 sets the third failure detection signal to "0", and outputs the third failure detection signal to the state determiner unit 901. The third failure detector unit 800 includes, for example, an electronic circuit. As another example, the third failure detector unit 800 is embodied by executing programs stored in a memory on a processor. The configuration of the memory and the processor is similar to that of FIG. 5.

Figure 10:
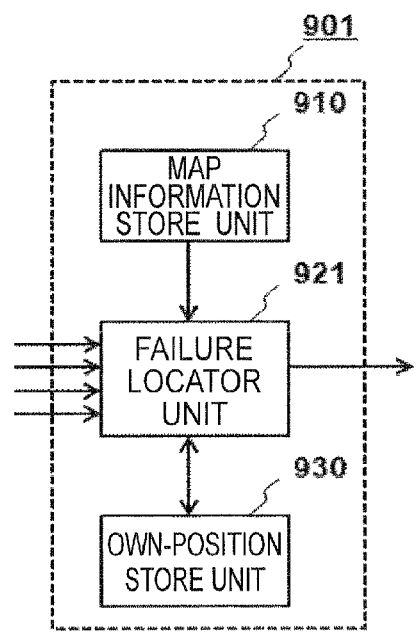
FIG. 10 shows an exemplary configuration of a state determiner unit in the satellite positioning system receiver according to the second embodiment of the present invention.

Next, the state determiner unit 901 is described. The state determiner unit 901 determines whether and where a failure exists in the satellite positioning system receiver 1B, based on the first failure detection signal, the second failure detection signal, and the third failure detection signal. FIG. 10 shows an exemplary configuration of the state determiner unit 901 in the satellite positioning system receiver 1B according to the second embodiment of the present invention. The state determiner unit 901 includes a map information store unit 910, a failure locator unit 921, and an own-position store unit 930. The map information store unit 910 and the own-position store unit 930 are similar to those of the first embodiment as shown in FIG. 8. The failure locator unit 921 includes, for example, an electronic circuit. As another example, the failure locator unit 921 is embodied by executing programs stored in a memory on a processor. The configuration of the memory and the processor is similar to that of FIG. 5.

The first failure detection signal, the second failure detection signal, and the third failure detection signal are inputted to the failure locator unit 921. The failure locator unit 921 determines whether and where a failure exists in the satellite positioning system receiver 1B, according to Table 2. When all of the first failure detection signal, the second failure detection signal, and the third failure detection signal are "0", the failure locator unit 921 determines that there is no failure location in the satellite positioning system receiver 1B (Types 1 to 3 in Table 2). When the first failure detection signal and the second failure detection signal are "0", and the third failure detection signal is "1", the failure locator unit 921 determines that there is a failure in the first positioning calculator unit 500A or the second positioning calculator unit 500B (Type 4 in Table 2).

When the first failure detection signal is "0", and the second failure detection signal is "1", the failure locator unit 921 determines that there is a failure in the first demodulator unit 400A or the second demodulator unit 400B (Types 5 and 6 in Table 2). When the first failure detection signal is "1", the failure locator unit 921 determines that there is a failure in the RF receiver unit 300 (Types 7 to 10 in Table 2). The failure locator unit 921 determines whether and where a failure exists in the satellite positioning system receiver 1B, as described above. In addition, the failure locator unit 921 also has a function to estimate a reason why the positioning-unavailability signal from the first positioning calculator unit 500A is "1", when the positioning-unavailability signal is "1" even though it is determined that there is no failure in the satellite positioning system receiver 1B (Types 2 and 3 in Table 2). This function is similar to that of the first embodiment.

The satellite positioning system receiver 1B according to the present embodiment operates as described above. The satellite positioning system receiver 1B according to the present embodiment can also detect a failure in the first positioning calculator unit 500A or the second positioning calculator unit 500B. Therefore, when there is a failure in the satellite positioning system receiver 1B, it is possible to more reliably detect whether and where a failure exists. In addition, the satellite positioning system receiver 1B according to the present embodiment also has the same advantageous effects as those described in the first embodiment.

Third Embodiment

The satellite positioning system receiver according to the second embodiment is configured to include the demodulator units as the dual system, and compare satellites acquired by the respective modulator units to diagnose a failure in the demodulator unit. In contrast, a satellite positioning system receiver according to the present embodiment is configured to diagnose a failure in a demodulator unit not configured as

TABLE 2

| TYPE | FIRST FAILURE DETECTION SIGNAL | SECOND FAILURE DETECTION SIGNAL | THIRD FAILURE DETECTION SIGNAL | POSITIONING-UNAVAILABILITY SIGNAL | MAP INFORMATION | DECISION RESULT |
|---|---|---|---|---|---|---|
| 1 | 0 | 0 | 0 | 0 | — | NO FAILURE LOCATION (NORMAL) |
| 2 | 0 | 0 | 0 | 1 | WITHIN PREDETERMINED RANGE | NO FAILURE LOCATION (DEGRADED RECEIVING ENVIRONMENT) |
| 3 | 0 | 0 | 0 | 1 | OUT OF PREDETERMINED RANGE | NO FAILURE LOCATION (DIRT ON ANTENNA RADOME) |
| 4 | 0 | 0 | 1 | — | — | FAILURE IN POSITIONING CALCULATOR UNIT |
| 5 | 0 | 1 | 0 | — | — | FAILURE IN DEMODULATOR UNIT |
| 6 | 0 | 1 | 1 | — | — | FAILURE IN DEMODULATOR UNIT |
| 7 | 1 | 0 | 0 | — | — | FAILURE IN RF RECEIVER UNIT |
| 8 | 1 | 0 | 1 | — | — | FAILURE IN RF RECEIVER UNIT |
| 9 | 1 | 1 | 0 | — | — | FAILURE IN RF RECEIVER UNIT |
| 10 | 1 | 1 | 1 | — | — | FAILURE IN RF RECEIVER UNIT |

Finally, modified embodiments of the satellite positioning system receiver 1B according to the present embodiment are described. At first, a first modified embodiment is described. The satellite positioning system receiver 1B as shown in FIG. 9 includes the positioning calculator units as the dual system including the first positioning calculator unit 500A and the second positioning calculator unit 500B. However, the satellite positioning system receiver 1B may include positioning calculator units as a multi system including three or more units. In such a case, the third failure detector unit 800 performs a majority decision, and determines that a positioning calculator unit having outputted a minority result is in the failure state. The first modified embodiment has been described above. Next, a second modified embodiment is described.

The satellite positioning system receiver 1B as shown in FIG. 9 includes the state determiner unit 901 to which the positioning-unavailability signal from the first positioning calculator unit 500A is inputted. However, the satellite positioning system receiver 1B may include the state determiner unit 901 to which the positioning-unavailability signal from the second positioning calculator unit 500B is inputted. The second modified embodiment has been described above.

a dual system. The satellite positioning system receiver according to the present embodiment selects a satellite traveling at a position which cannot be acquired by the satellite positioning system receiver, and generates a first simulated signal that simulates a first satellite signal transmitted from the selected satellite. In addition, the satellite positioning system receiver according to the present embodiment converts the band of the first simulated signal to generate a second simulated signal, demodulates the second simulated signal by the demodulator unit, and determines whether a failure exists in the demodulator unit, based on the demodulation result. It is noted that, in the satellite positioning system receiver according to the present embodiment, a first test signal having a frequency in the RF frequency band is combined within a frequency band of the first simulated signal.

Figure 11:
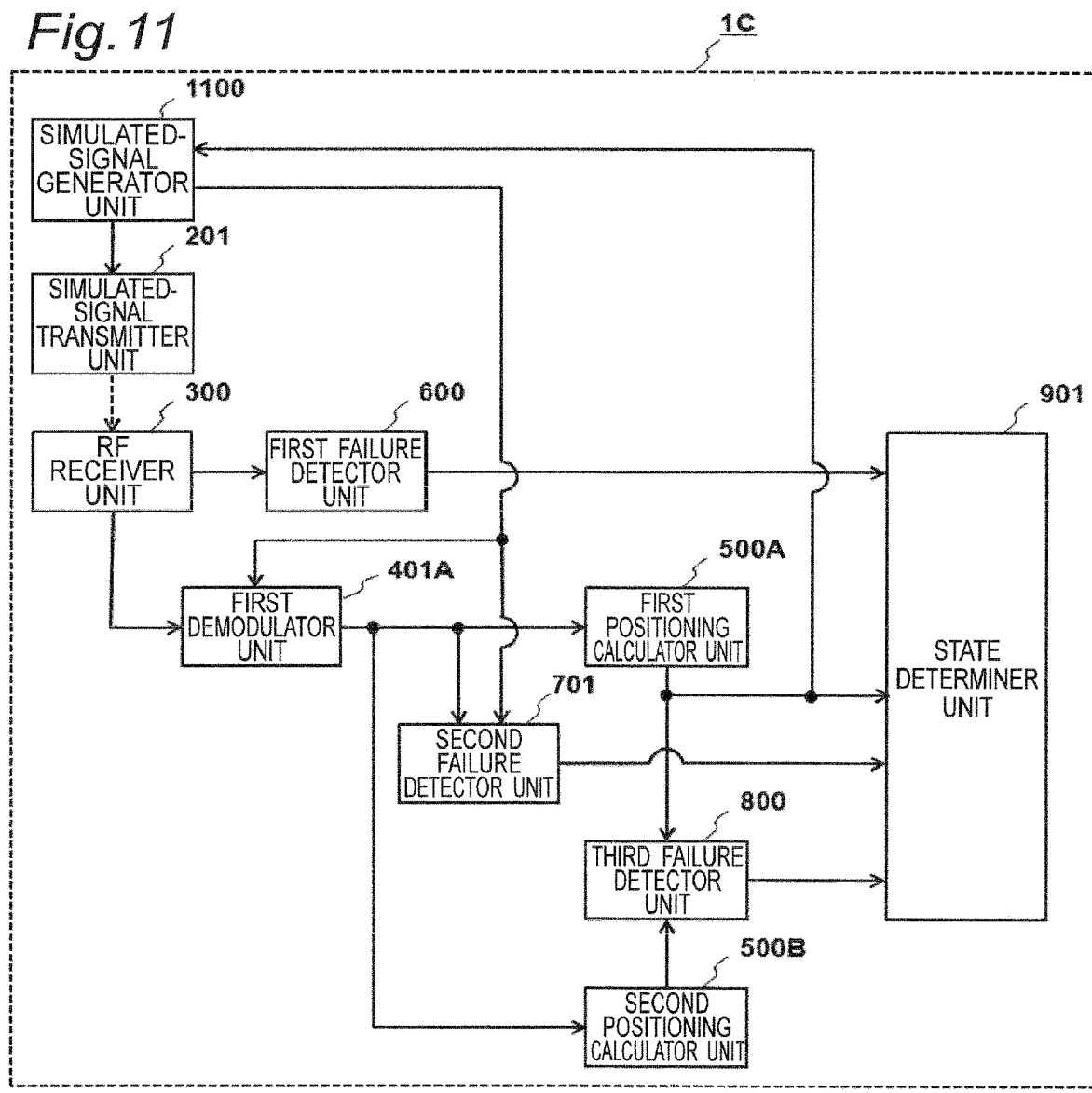
FIG. 11 shows a configuration of a satellite positioning system receiver according to a third embodiment of the present invention.

FIG. 11 shows a configuration of a satellite positioning system receiver 1C according to a third embodiment of the present invention. The satellite positioning system receiver 1C according to the present embodiment is different from the satellite positioning system receiver 1B as shown in FIG. 9 in the following four points. The first difference is that the satellite positioning system receiver 1C according to the present embodiment includes a simulated-signal generator unit 1100 and a simulated-signal transmitter unit 201, instead of the test signal generator unit 100 and the test signal transmitter unit 200. The second difference is that the satellite positioning system receiver 1C according to the present embodiment does not include the second demodulator unit 400B, but includes only a first demodulator unit 401A. The third difference is that operation of the first demodulator unit 401A as shown in FIG. 11 is different from the operation of the first demodulator unit 400A as shown in FIG. 9. The fourth difference is that operation of a second failure detector unit 701 as shown in FIG. 11 is different from the operation of the second failure detector unit 700 as shown in FIG. 9. It is noted that constituent elements similar to those of the satellite positioning system receiver 1B as shown in FIG. 9 are denoted by the same reference signs, and their descriptions are omitted.

Figure 12:
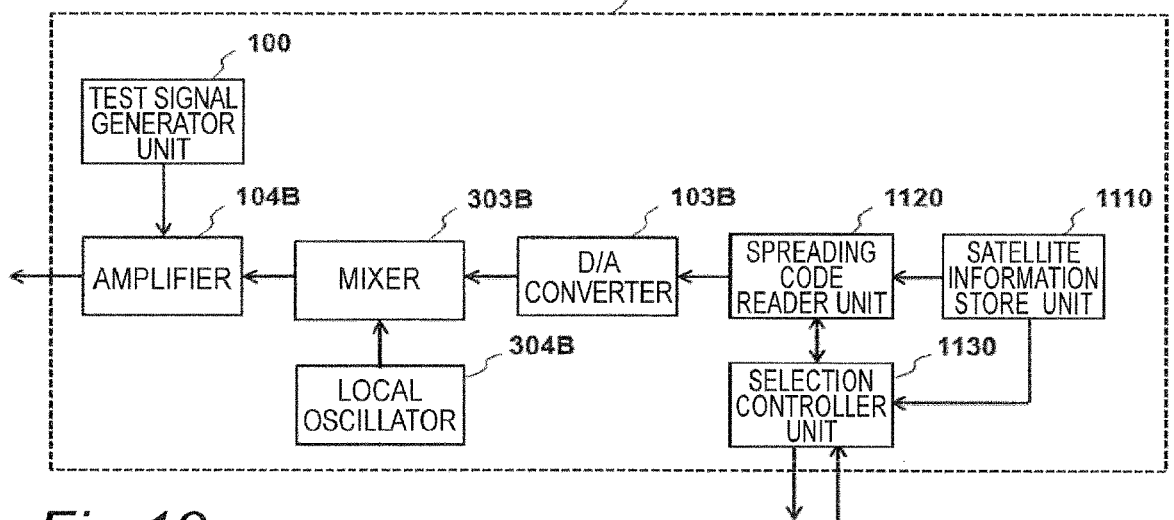
FIG. 12 shows an exemplary configuration of a simulated-signal generator unit in the satellite positioning system receiver according to the third embodiment of the present invention.

At first, the simulated-signal generator unit 1100 is described. FIG. 12 shows an exemplary configuration of the simulated-signal generator unit 1100 in the satellite positioning system receiver 1C according to the third embodiment of the present invention. The simulated-signal generator unit 1100 includes a satellite information store unit 1110, a spreading code reader unit 1120, a selection controller unit 1130, a D/A converter 103B, a mixer 303B, a local oscillator 304B, an amplifier 104B, and a test signal generator unit 100. The satellite information store unit 1110 stores, in advance, spreading code signal waveforms of all satellites, and information including six orbit elements required for calculating an orbit of each satellite, as satellite information. The satellite information stored in the satellite information store unit 1110 is updated to the latest information by, for example, receiving Ephemeris, Almanac, or Two-line elements through a wireless network.

The own position and the positioning-unavailability signal outputted from the first positioning calculator unit 500A are inputted to the selection controller unit 1130. The selection controller unit 1130 also has a function to store the own position. While the positioning-unavailability signal is "0", the selection controller unit 1130 continuously updates the stored own position to the latest information. It is noted that the selection controller unit 1130 may be configured to stop updating of the own position when conducting failure diagnosis as described below. In addition, the selection controller unit 1130 selects one of satellites that are less likely to be acquired by the satellite positioning system receiver 1C, based on the latest own position stored in the selection controller unit 1130 itself, and the satellite information stored in the satellite information store unit 1110. In addition, the selection controller unit 1130 outputs identification information of the selected satellite to the first demodulator unit 401A and the second failure detector unit 701.

The spreading code reader unit 1120 is controlled by the selection controller unit 1130 to read the spreading code signal waveform of the selected satellite from the satellite information store unit 1110, and to output the spreading code signal waveform to the D/A converter 103B. The selection controller unit 1130 and the spreading code reader unit 1120 include, for example, electronic circuits. As another example, the selection controller unit 1130 and the spreading code reader unit 1120 are embodied by executing programs stored in a memory on a processor. The configuration of the memory and the processor is similar to that of FIG. 5.

Here, a method for the selection controller unit 1130 to select a satellite that is less likely to be acquired is described.

The selection controller unit 1130 calculates the absolute coordinate of each satellite using the satellite information stored in the satellite information store unit 1110, and obtains the elevation angle θ of each satellite using the absolute coordinate of the own position. In this case, the elevation angle θ of a satellite is defined as an angle elevating with respect to a horizontal plane tangent to the ground. The satellite positioning system receiver 1C can receive a signal from a satellite above the horizontal plane, but cannot receive a signal from a satellite below the horizontal plane. That is, the satellite positioning system receiver 1C cannot acquire a satellite having a negative elevation angle θ, and never receive a first satellite signal transmitted from this satellite.

The D/A converter 103B converts the spreading code signal waveform inputted from the spreading code reader unit 1120, into an analog signal. The mixer 303B mixes the analog signal outputted from the D/A converter 103B, with a sinusoidal wave generated by the local oscillator 304B, to convert a signal in the baseband frequency band into a signal in the RF frequency band. The signal outputted from the mixer 303B in the RF frequency band is referred to as "third simulated signal". The frequency band of the third simulated signal is the same as the frequency band of the first satellite signal. The test signal generator unit 100 is the same as that of the first embodiment as shown in FIG. 2, and generates a first test signal having a frequency in the RF frequency band. The amplifier 104B amplifies the third simulated signal to a predetermined signal level, combines the amplified third simulated signal with the first test signal, and outputs the combined signal as a first simulated signal. Accordingly, the first test signal is combined within a frequency band of the first simulated signal. In other words, the frequency band of the first simulated signal includes the first test signal having the frequency in the RF frequency band.

As described in the first embodiment, the frequency or frequency band of the first test signal is set so as not to overlap the frequency band of the first satellite signal. Meanwhile, the frequency band of the third simulated signal is the same as the frequency band of the first satellite signal. Accordingly, the frequency or frequency band of the first test signal does not overlap the frequency band of the third simulated signal. Therefore, the third simulated signal is in a predetermined frequency band of the first simulated signal, and the first test signal is in a predetermined frequency band different from that of the third simulated signal. The simulated-signal generator unit 1100 operates as described above, to generate the first simulated signal having the frequency in the RF frequency band.

Next, a process of converting the first simulated signal into the second simulated signal and inputting the second simulated signal to the first demodulator unit 401A is described. The first simulated signal is inputted to the simulated-signal transmitter unit 201. The simulated-signal transmitter unit 201 transmits the first simulated signal to the RF receiver unit 300. The first simulated signal in the RF frequency band is received and converted into the second simulated signal in the baseband frequency band by the RF receiver unit 300. The frequency band of the third simulated signal included in the first simulated signal is the same as the frequency band of the first satellite signal. Accordingly, a signal having a frequency component corresponding to the third simulated signal, which is included in the second simulated signal, is extracted from the second simulated signal by the first filter 306, and converted into a digital signal by the A/D converter 308A. That is, a signal obtained by converting the frequency band of the third simulated signal into the baseband frequency band, which is included in the second simulated signal, passes through the first filter 306, and is then converted into a digital signal by the A/D converter 308A. The second simulated signal converted into the digital signal is combined with the second satellite signal, and the combined signal is outputted to the first demodulator unit 401A.

Meanwhile, a signal having a frequency component corresponding to the first test signal, which is included in the second simulated signal, is extracted from the second simulated signal by a second filter 307, and treated as the second test signal. That is, a signal obtained by converting the frequency band of the first test signal into the baseband frequency band, which is included in the second simulated signal, passes through the second filter 307, and is treated as the second test signal. The second test signal outputted from the second filter 307 is converted into a digital signal by the A/D converter 308B, and then outputted to the first failure detector unit 600. The second test signal is obtained by converting the frequency band of the first test signal included in the first simulated signal from the RF frequency band into the baseband frequency band. Accordingly, the second test signal is included in the second simulated signal, and within a frequency band determined according to the frequency band of the first test signal.

Figure 13:
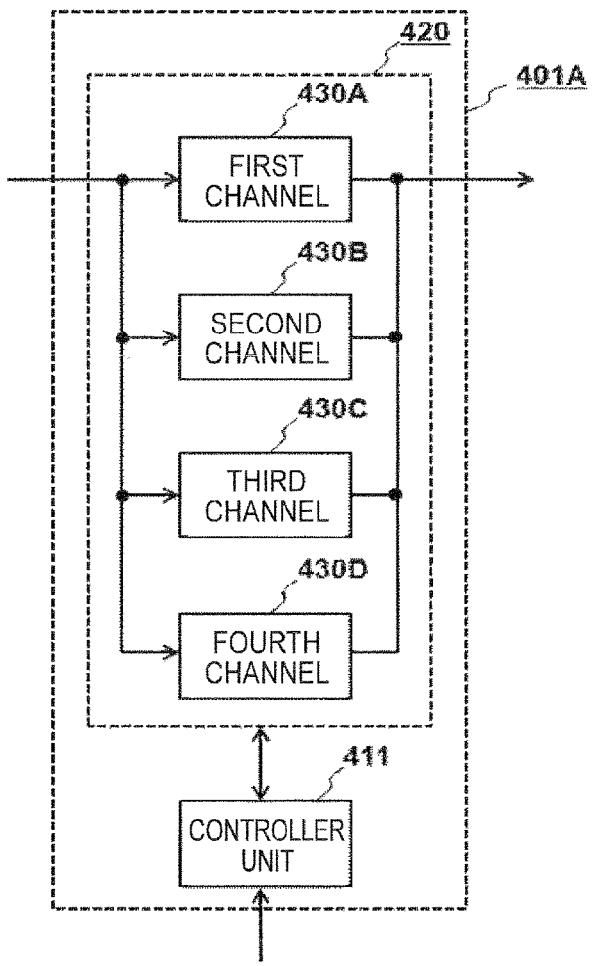
FIG. 13 shows an exemplary configuration of a first demodulator unit in the satellite positioning system receiver according to the third embodiment of the present invention.

Next, the first demodulator unit 401A is described. FIG. 13 is an exemplary configuration of the first demodulator unit 401A in the satellite positioning system receiver 1C according to the third embodiment of the present invention. The first demodulator unit 401A has substantially the same configuration as that of the first demodulator unit 400A as shown in FIG. 6, but is different therefrom in that the identification information of the satellite selected by the simulated-signal generator unit 1100 is inputted to a controller unit 411. In addition, the first demodulator unit 401A is different from the first demodulator unit 400A in that the first demodulator unit 401A conducts operation for failure diagnosis as described below.

During failure diagnosis, the controller unit 411 included in the first demodulator unit 401A selects a channel for which failure diagnosis is conducted. It is assumed that, for example, the first channel 430A is selected. The configuration of the first channel 430A is as shown in FIG. 7. In the first channel 430A, the code generator unit 431 generates the spreading code signal of the satellite selected by the simulated-signal generator unit 1100, and the correlation calculator unit 432 calculates the correlation value between the signal inputted from the RF receiver unit 300 and the spreading code signal. The controller unit 411 determines whether the satellite selected for failure diagnosis is acquired, based on the calculated correlation value.

A signal obtained by combining the second simulated signal having passed through the first filter 306 with the second satellite signal is inputted to the correlation calculator unit 432. Therefore, when the selected channel is normal, the selected satellite is acquired in the selected channel for failure diagnosis. The correlation calculator unit 432 outputs identification information of the acquired satellite to the second failure detector unit 701. When the satellite is not acquired, the correlation calculator unit 432 outputs a signal indicating that the satellite is not acquired. It is noted that, in channels for which failure diagnosis is not conducted, a process similar to that described in the first embodiment is done. It is noted that the controller unit 411 may individually and sequentially select a channel for which failure diagnosis is conducted, or may simultaneously conduct failure diagnosis on a plurality of channels. In addition, the controller unit 411 may continuously conduct the operation for failure diagnosis, or conduct the operation for failure diagnosis at a predetermined time interval.

It is noted that preferably, the first demodulator unit 401A includes five or more channels. In addition, preferably, each of the first positioning calculator unit 500A and the second positioning calculator unit 500B calculates the own position using the correlation value outputted from the channel for which failure diagnosis is not conducted. The correlation value between the second satellite signal and the spreading code is outputted from the channel for which failure diagnosis is not conducted. Accordingly, by using such a configuration, the satellite positioning system receiver 1C can continuously calculate the own position when conducting failure diagnosis.

Finally, the second failure detector unit 701 is described. The second failure detector unit 701 determines whether the satellite selected by the simulated-signal generator unit 1100 is acquired by the first demodulator unit 401A, when conducting failure diagnosis in the first demodulator unit 401A. When the selected satellite is acquired, the second failure detector unit 701 determines that the first demodulator unit 401A is normal, sets the second failure detection signal to "0", and outputs the second failure detection signal to the state determiner unit 901. When the selected satellite is not acquired, the second failure detector unit 701 determines that there is a failure in the first demodulator unit 401A, sets the second failure detection signal to "1", and outputs the second failure detection signal to the state determiner unit 901. It is noted that the second failure detector unit 701 may receive information of channels for which failure diagnosis is conducted, from the first demodulator unit 401A, and output which channel is in a failure state.

As described above, in the satellite positioning system receiver 1C according to the present embodiment, the simulated-signal generator unit 1100 selects the satellite traveling at the predetermined position, and generates the first simulated signal that simulates the satellite signal transmitted from the selected satellite. The first simulated signal includes the first test signal. In addition, the simulated-signal transmitter unit 201 transmits the first simulated signal. In addition, the RF receiver unit 300 receives the first simulated signal and the first satellite signal through the receiving antenna 301, and generates the second simulated signal and the second satellite signal, respectively. In addition, the RF receiver unit 300 outputs the signal in the predetermined frequency band, which is included in the second simulated signal, to the first demodulator unit 401A, and outputs the signal in another predetermined frequency band as the second test signal.

In addition, the first demodulator unit 401A calculates the correlation value between the second simulated signal and the spreading code, to acquire the satellite selected by the simulated-signal generator unit, and calculates the correlation value between the second satellite signal and the spreading code, to acquire the satellite transmitting the first satellite signal. In addition, each of the first positioning calculator unit 500A and the second positioning calculator unit 500B calculates the own position using the correlation value between the second satellite signal and the spreading code. In addition, the first failure detector unit 600 compares signal intensity of the second test signal with the threshold, to generate the first failure detection signal. In addition, the second failure detector unit 701 determines whether the satellite selected by the simulated-signal generator unit 1100 is acquired by the first demodulator unit 401A, to generate the second failure detection signal. In addition, the state determiner unit 901 determines whether and where a failure exists, using the first failure detection signal and the second failure detection signal. Accordingly, it is possible to detect a failure in the demodulator unit without using multiple modulator units. In addition, the satellite positioning system receiver 1B according to the present embodiment also has the same advantageous effects as those described in the first and second embodiments.

Fourth Embodiment

Each of the satellite positioning system receivers according to the second and third embodiments is configured to include the positioning calculator units as the dual system, and compare calculation results of the respective positioning calculator units to diagnose a failure in the positioning calculator units. However, a satellite positioning system receiver may be configured to diagnose a failure in a positioning calculator unit not configured as the dual system. A satellite positioning system receiver according to the present embodiment selects at least four satellites traveling at positions which cannot be acquired by the satellite positioning system receiver, and generates a first simulated signal that simulate first satellite signals transmitted from the selected satellites. In addition, the satellite positioning system receiver according to the present embodiment generates a second simulated signal by converting the band of the first simulated signal, demodulates the second simulated signal by a demodulator unit, and obtains an own position by the positioning calculator unit. In addition, the satellite positioning system receiver according to the present embodiment determines whether a failure exists in the positioning calculator unit, based on the obtained own position.

Figure 14:
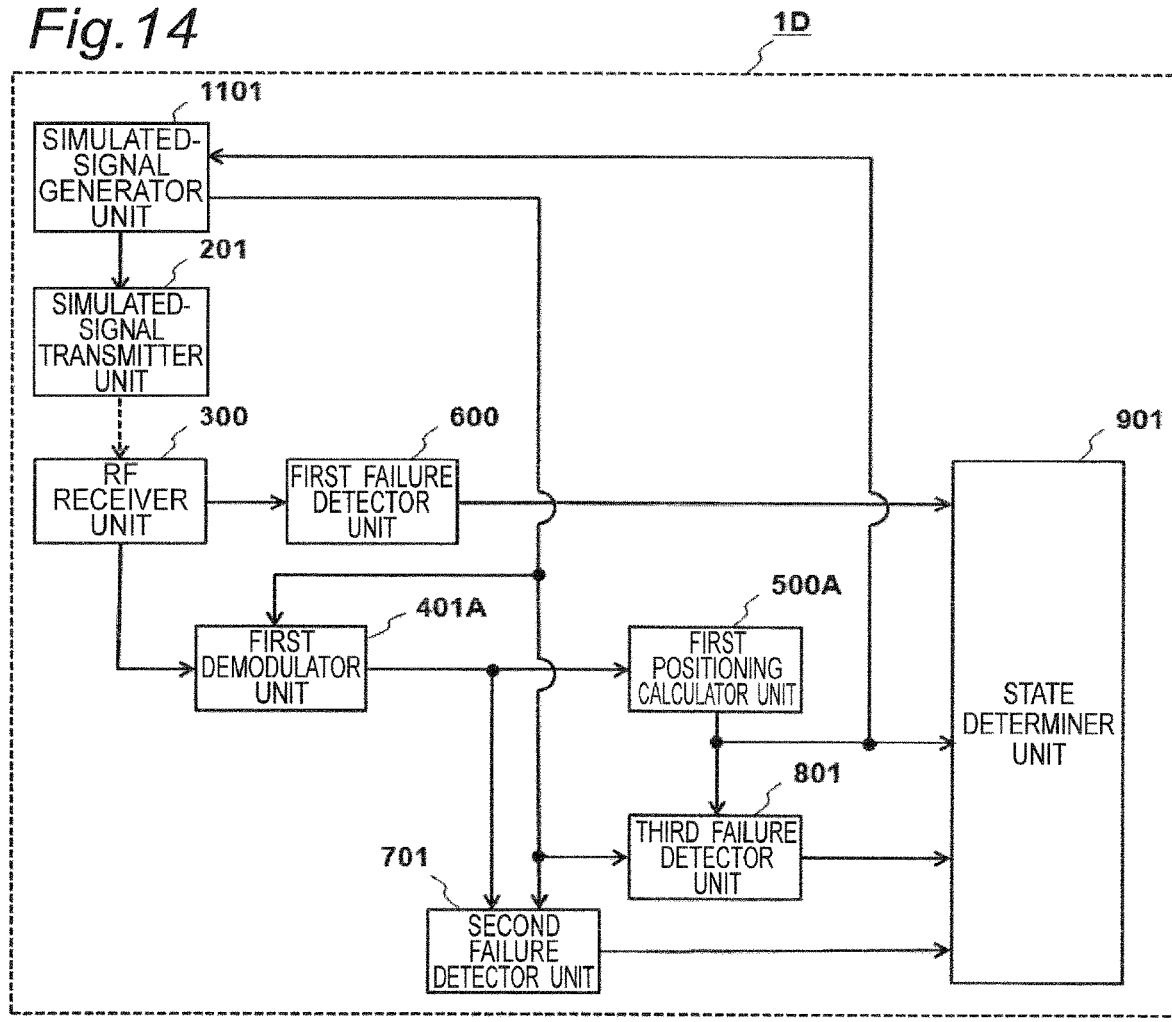
FIG. 14 shows a configuration of a satellite positioning system receiver according to a fourth embodiment of the present invention.

FIG. 14 shows a configuration of a satellite positioning system receiver 1D according to a fourth embodiment of the present invention. The satellite positioning system receiver 1D according to the present embodiment is different from the satellite positioning system receiver 1C as shown in FIG. 11 in the following three points. The first difference is that a simulated-signal generator unit 1101 as shown in FIG. 14 has a different configuration from that of the simulated-signal generator unit 1100 as shown in FIG. 11. The second difference is that the satellite positioning system receiver 1D according to the present embodiment does not include the second positioning calculator unit 500B, but includes only the first positioning calculator unit 500A. The third difference is that operation of a third failure detector unit 801 as shown in FIG. 14 is different from the operation of the third failure detector unit 800 as shown in FIG. 11. It is noted that constituent elements similar to those of the satellite positioning system receiver 1C as shown in FIG. 11 are denoted by the same reference signs, and their descriptions are omitted.

Figure 15:
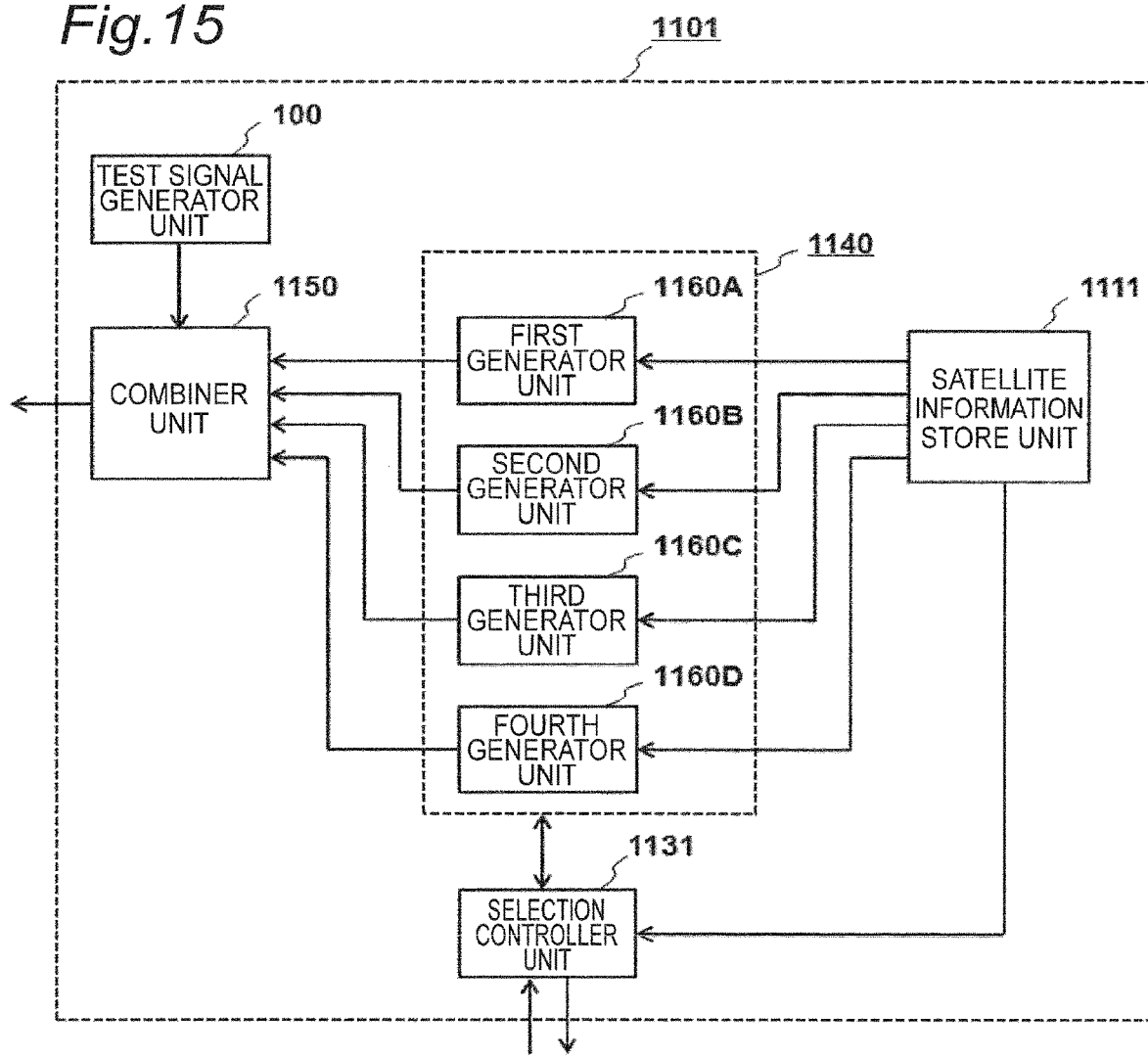
FIG. 15 shows an exemplary configuration of a simulated-signal generator unit in the satellite positioning system receiver according to the fourth embodiment of the present invention.

At first, the simulated-signal generator unit 1101 is described. FIG. 15 shows an exemplary configuration of the simulated-signal generator unit 1101 in the satellite positioning system receiver 1D according to the fourth embodiment of the present invention. The simulated-signal generator unit 1101 includes a satellite information store unit 1111, a selection controller unit 1131, a signal generator unit 1140, a combiner unit 1150, and a test signal generator unit 100. In addition, the signal generator unit 1140 includes a first generator unit 1160A, a second generator unit 1160B, a third generator unit 1160C, and a fourth generator unit 1160D. The satellite information store unit 1111 stores, in advance, spreading code signal waveforms of all satellites, and information including six orbit elements required for calculating an orbit of each satellite, as satellite information. In addition, the satellite information store unit 1111 also stores, in advance, navigation messages for satellites as the satellite information. The signal generator unit 1140 is controlled by the selection controller unit 1131, and generates four simulated signals using the satellite information. The test signal generator unit 100 is similar to that of the first embodiment as shown in FIG. 2, and generates the first test signal. The combiner unit 1150 is a combining circuit for combining signals, and combines the four simulated signals and the first test signal with each other.

The own position and the positioning-unavailability signal outputted from the first positioning calculator unit 500A are inputted to the selection controller unit 1131. The selection controller unit 1131 also has a function to store the own position. The selection controller unit 1131 continuously updates the stored own position to the latest information, not during failure detection as described below, but during a period in which the positioning-unavailability signal is "0". In addition, the selection controller unit 1131 selects any four of satellites that are less likely to be acquired by the satellite positioning system receiver ID, based on the latest own position stored in the selection controller unit 1131 itself, and the satellite information stored in the satellite information store unit 1111. In addition, the selection controller unit 1131 controls the signal generator unit 1140 to read satellite information of the selected four satellites from the satellite information store unit 1111. In addition, the selection controller unit 1131 determines signal delay times based on distance differences between the positions of the selected satellites and a predetermined reference position, and supplies the signal delay times to the signal generator unit 1140. The signal delay times are described below.

Here, the selection controller unit 1131 controls the first generator unit 1160A, the second generator unit 1160B, the third generator unit 1160C, and the fourth generator unit 1160D such that they read satellite information of different satellites, respectively. In addition, the selection controller unit 1131 outputs identification information of selected four satellites to the first demodulator unit 401A and the second failure detector unit 701. In addition, the selection controller unit 1131 outputs information of the reference position to the third failure detector unit 801. The selection controller unit 1131 includes, for example, an electronic circuit. As another example, the selection controller unit 1131 is embodied by executing programs stored in a memory on a processor. The configuration of the memory and the processor is similar to that of FIG. 5.

Figure 16:
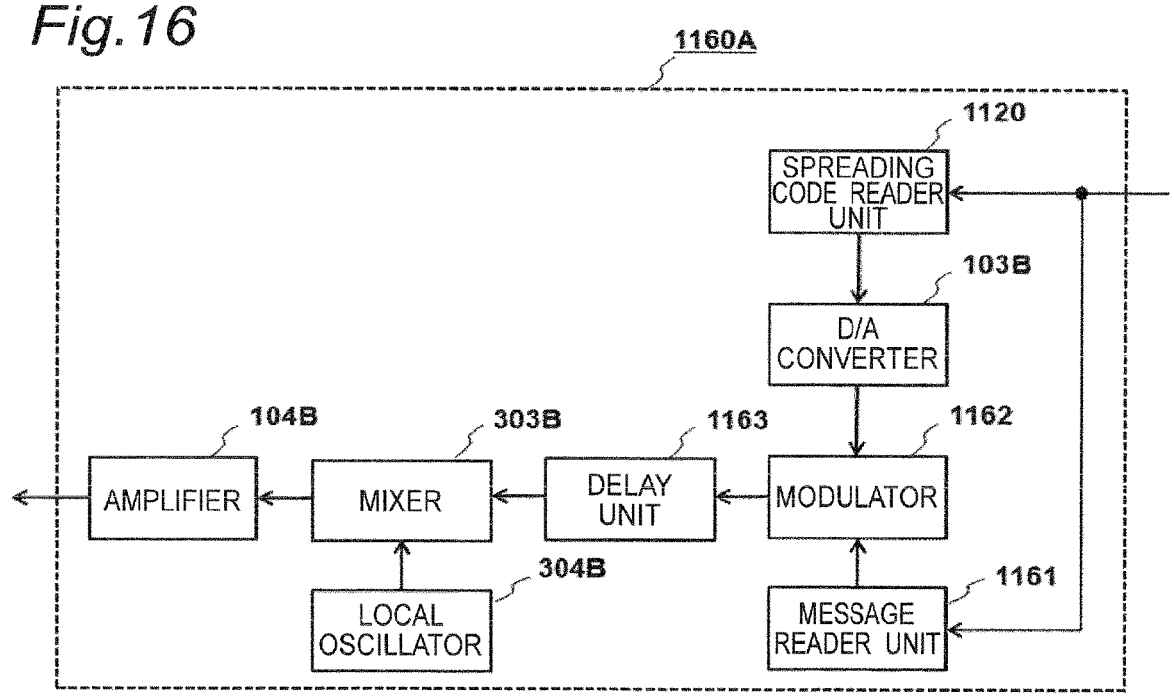
FIG. 16 shows an exemplary configuration of a first generator unit in the satellite positioning system receiver according to the fourth embodiment of the present invention.

FIG. 16 shows an exemplary configuration of the first generator unit 1160A in the satellite positioning system receiver 1D according to the fourth embodiment of the present invention. The first generator unit 1160A includes a spreading code reader unit 1120, a D/A converter 103B, a message reader unit 1161, a modulator 1162, a delay unit 1163, a mixer 303B, a local oscillator 304B, and an amplifier 104B. The spreading code reader unit 1120 is controlled by the selection controller unit 1131, to read the spreading code signal waveform of the satellite specified by the selection controller unit 1131, from the satellite information store unit 1111, and to output the spreading code signal waveform to the D/A converter 103B. The D/A converter 103B converts the spreading code signal waveform inputted from the spreading code reader unit 1120, into an analog signal.

The message reader unit 1161 reads a navigation message of the satellite specified by the selection controller unit 1131, from the satellite information store unit 1111, and outputs the navigation message to the modulator 1162. The modulator 1162 modulates the navigation message using the spreading code signal waveform having been converted into the analog signal, and outputs the modulated signal to the delay unit 1163. The delay unit 1163 delays the signal according to the signal delay time supplied from the selection controller unit 1131. The mixer 303B mixes the signal delayed by the delay unit 1163, with the sinusoidal wave generated by the local oscillator 304B, to convert a signal in the baseband frequency band into a signal in the RF frequency band. The amplifier 104B amplifies the signal outputted from the mixer 303B in the converted band, to a predetermined signal level, and outputs the amplified signal as the third simulated signal. The frequency band of the third simulated signal is the same as the frequency band of the first satellite signal.

The first generator unit 1160A operates as described above. It is noted that the second generator unit 1160B, the third generator unit 1160C, and the fourth generator unit 1160D are also configured in a manner similar to that of the first generator unit 1160A, and operate in a manner similar to that of the first generator unit 1160A. The combiner unit 1150 combines the four third simulated signals outputted from the signal generator unit 1140, with the first test signal outputted from the test signal generator unit 100, to generate the first simulated signal, and outputs the first simulated signal to the simulated-signal transmitter unit 201.

Here, a method by for the selection controller unit 1131 to determine the signal delay time is described. For purpose of description, it is assumed that a satellite A, a satellite B, a satellite C, and a satellite D are selected by the selection controller unit 1131. The selection controller unit 1131 calculates the distances La, Lb, Lc, and Ld between the predetermined reference position and each of the selected satellites. Assuming La<Lb<Lc<Ld, the time difference between the time when the first satellite signal from the satellite A that is closest to the reference position reaches the reference position, and the time when the first satellite signal from the satellite B that is second closest to the reference position reaches the reference position is calculated as (Lb−La)/c, where "c" denotes a light speed. Similarly, the time difference between the time when the first satellite signal from the satellite A reaches the reference position, and the time when the first satellite signal from the satellite C reaches the reference position is calculated as (Lc−La)/c. The time difference between the time when the first satellite signal from the satellite A reaches the reference position, and the time when the first satellite signal from the satellite D reaches the reference position is calculated as (Ld−La)/c.

The selection controller unit 1131 sets the signal delay time to "0", as a reference, for the simulated signal of the satellite A that is closest to the reference position. In addition, the selection controller unit 1131 sets the signal delay time to (Lb−La)/c for the simulated signal of the satellite B, the signal delay time to (Lc−La)/c for the simulated signal of the satellite C, and the signal delay time to (Ld−La)/c for the simulated signal of the satellite D. In the satellite positioning system receiver 1D according to the present embodiment, the simulated-signal generator unit 1101 operates as described above, to generate the first simulated signal having the frequency in the RF frequency band.

Next, a process of inputting the first simulated signal to the first demodulator unit 401A is described. The first simulated signal is inputted to the simulated-signal transmitter unit 201. The simulated-signal transmitter unit 201 transmits the first simulated signal to the RF receiver unit 300. The first simulated signal in the RF frequency band is received and converted into the second simulated signal in the baseband frequency band by the RF receiver unit 300. The frequency band of the third simulated signal included in the first simulated signal is the same as the frequency band of the first satellite signal. Accordingly, a signal obtained by converting the frequency band of the third simulated signal into the baseband frequency band, which is included in the second simulated signal, passes through the first filter 306, and is then converted into a digital signal by the A/D converter 308A. The second simulated signal converted into the digital signal is combined with the second satellite signal, and then outputted to the first demodulator unit 401A.

Next, the first demodulator unit 401A and the second failure detector unit 701 are described. The first demodulator unit 401A and the second failure detector unit 701 basically operate in the same manner as in the third embodiment. However, according to the satellite positioning system receiver 1D of the present embodiment, the simulated-signal generator unit 1101 selects the four satellites for failure diagnosis, and the first demodulator unit 401A calculates four correlation values using spreading code signals of the selected four satellites when conducting failure detection. The second failure detector unit 701 determines whether a satellite selected by the simulated-signal generator unit 1101 is acquired by the first demodulator unit 401A, to determine whether a failure exists in the first demodulator unit 401A. It is noted that the first demodulator unit 401A may calculate four or more correlation values using spreading code signals of satellites other than the selected four satellites.

Finally, the first positioning calculator unit 500A and the third failure detector unit 801 are described. The first positioning calculator unit 500A basically operates in the same manner as described in the first to third embodiments. However, according to the satellite positioning system receiver 1D of the present embodiment, when conducting failure detection, the first positioning calculator unit 500A calculates the own position for failure detection using four correlation values corresponding to the four satellites selected by the simulated-signal generator unit 1101. The own position for failure detection calculated by the first positioning calculator unit 500A, and information of the reference position outputted from the simulated-signal generator unit 1101 are inputted to the third failure detector unit 801. The third failure detector unit 801 compares the own position for failure detection calculated by the first positioning calculator unit 500A, with the reference position, to determine whether a failure exists in the first positioning calculator unit 500A.

When the distance between the own position for failure detection calculated by the first positioning calculator unit 500A and the reference position is less than or equal to a predetermined threshold, the third failure detector unit 801 determines that there is no failure in the first positioning calculator unit 500A, sets the third failure detection signal to "0", and outputs the third failure detection signal to the state determiner unit 901. On the other hand, when the distance between the own position for failure detection calculated by the first positioning calculator unit 500A and the reference position exceeds the predetermined threshold, the third failure detector unit 801 determines that there is a failure in the first positioning calculator unit 500A, sets the third failure detection signal to "1", and outputs the third failure detection signal to the state determiner unit 901. The satellite positioning system receiver 1D according to the present embodiment operates as described above.

The satellite positioning system receiver 1D according to the present embodiment of the present invention includes the third failure detector unit 801. In addition, the simulated-signal generator unit 1101 selects at least four satellites, and generates the first simulated signal that simulates satellite signals transmitted from the selected satellites and received at the reference position. In addition, when conducting failure diagnosis, the positioning calculator unit calculates the own position for failure diagnosis using the correlation value between the second simulated signal and the spreading code. In addition, the third failure detector unit compares the own position for failure diagnosis with the reference position, to generate the third failure detection signal. In addition, the state determiner unit determines whether and where a failure exists, using the first failure detection signal, the second failure detection signal, and the third failure detection signal. Accordingly, the satellite positioning system receiver 1D according to the present embodiment can detect a failure in the positioning calculator unit without using multiple positioning calculator units. In addition, the satellite positioning system receiver 1D according to the present embodiment has the same advantageous effects as those described in the first, second, and third embodiments.

Fifth Embodiment

Figure 17:
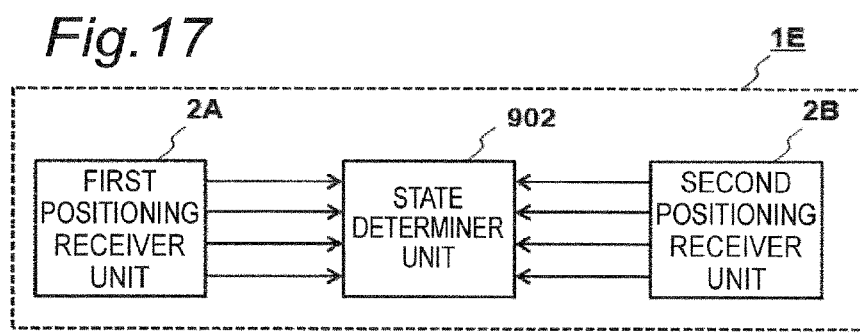
FIG. 17 shows a configuration of a satellite positioning system receiver according to a fifth embodiment of the present invention.

Each of the satellite positioning system receivers according to the second, third, and fourth embodiments is configured to include one positioning receiver unit that includes the first failure detector unit, the second failure detector unit, and the third failure detector unit. In contrast, a satellite positioning system receiver according to the present embodiment includes two positioning receiver units, and thus, determines whether a failure exists in the satellite positioning system receiver, whether receiving environment of receiving antennas degrades, and whether dirt on a radome of the receiving antennas exists, without using map information. FIG. 17 shows a configuration of a satellite positioning system receiver 1E according to a fifth embodiment of the present invention. The satellite positioning system receiver 1E according to the present embodiment includes two positioning receiver units, that is, a first positioning receiver unit 2A and a second positioning receiver unit 2B, and a state determiner unit 902. The state determiner unit 902 determines whether and where a failure exists in the satellite positioning system receiver 1E, using signals from the two positioning receiver units.

Figure 18:
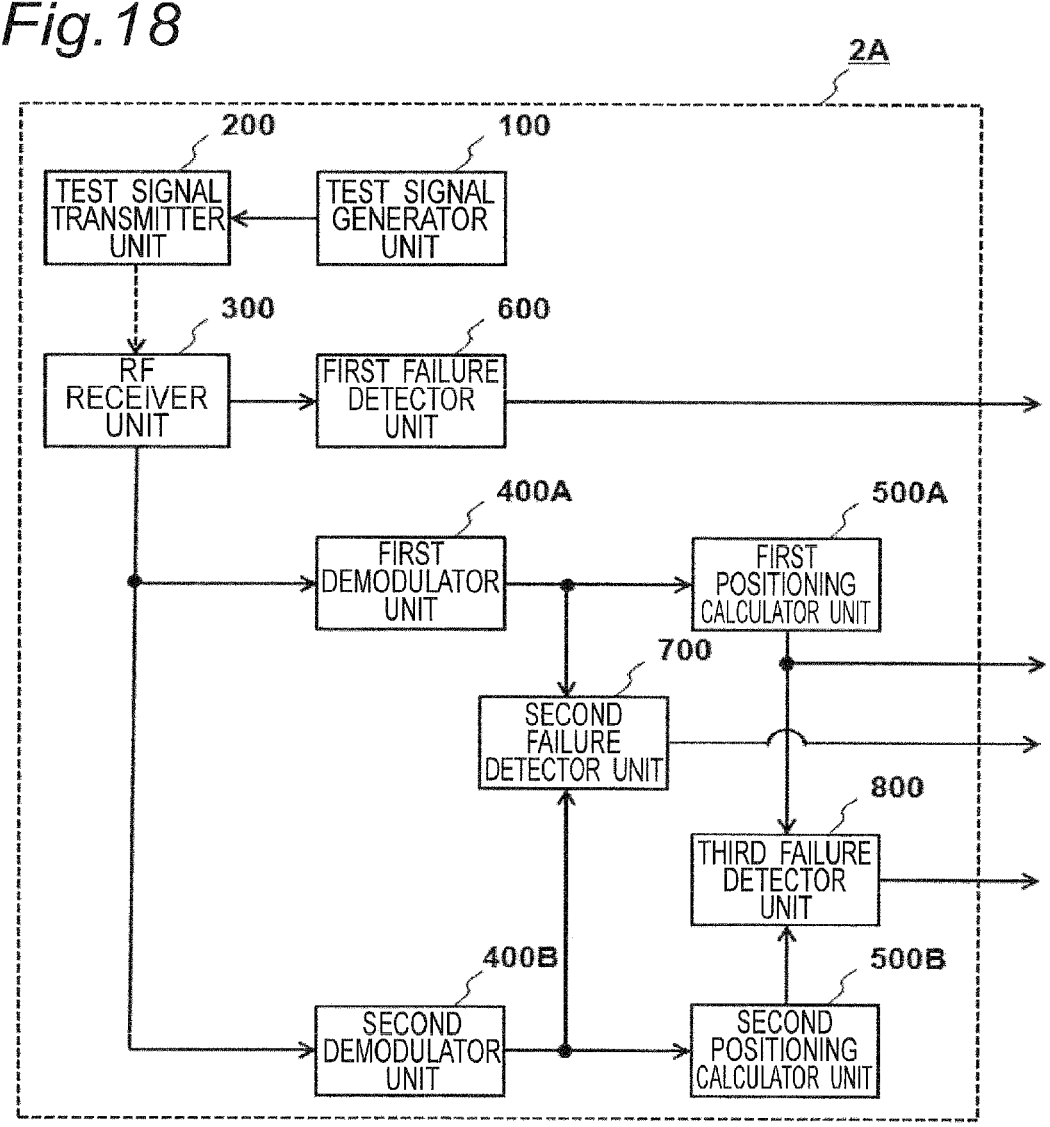
FIG. 18 shows an exemplary configuration of a first positioning receiver unit in the satellite positioning system receiver according to the fifth embodiment of the present invention.
Figure 19:
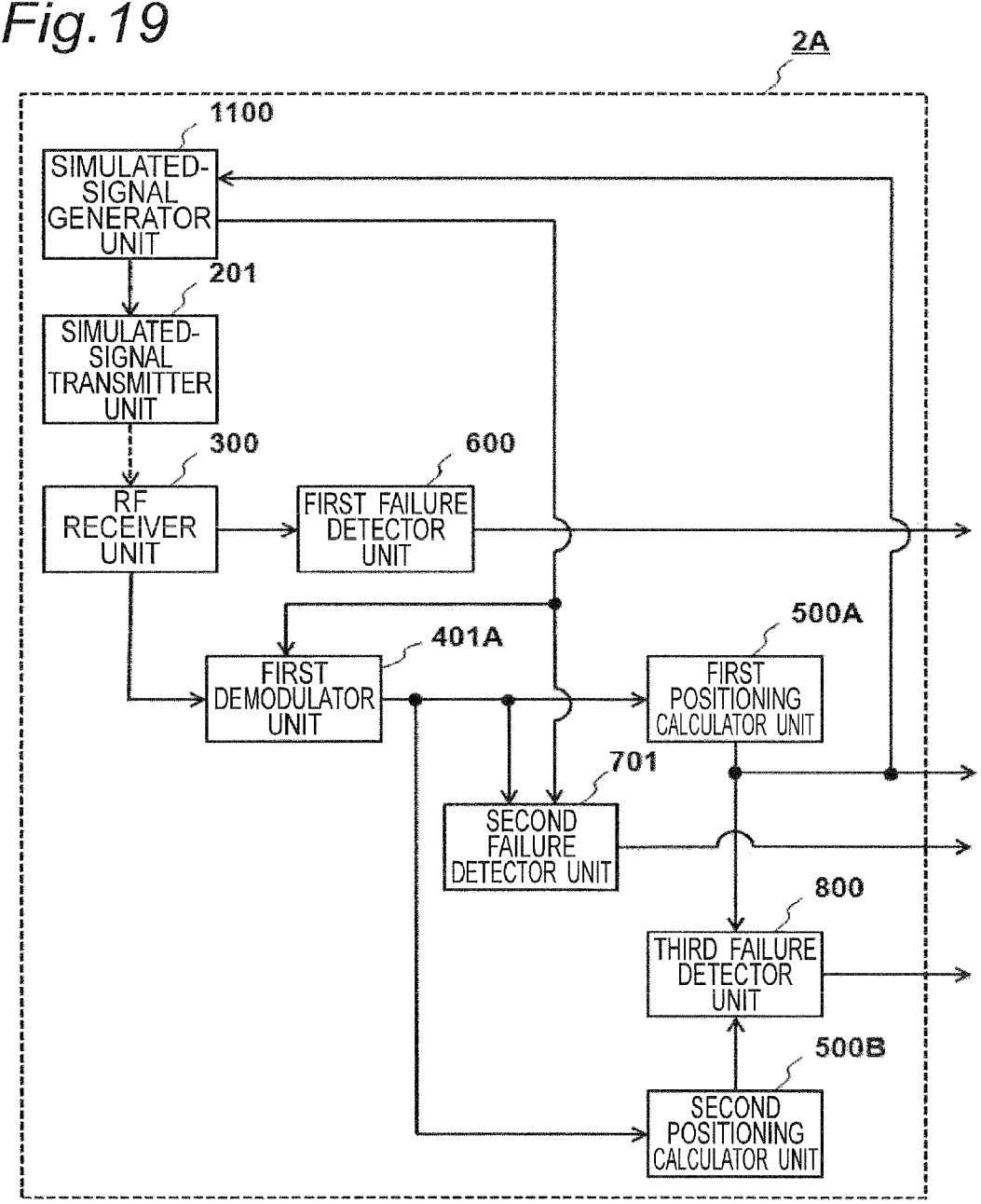
FIG. 19 shows another exemplary configuration of the first positioning receiver unit in the satellite positioning system receiver according to the fifth embodiment of the present invention.
Figure 20:
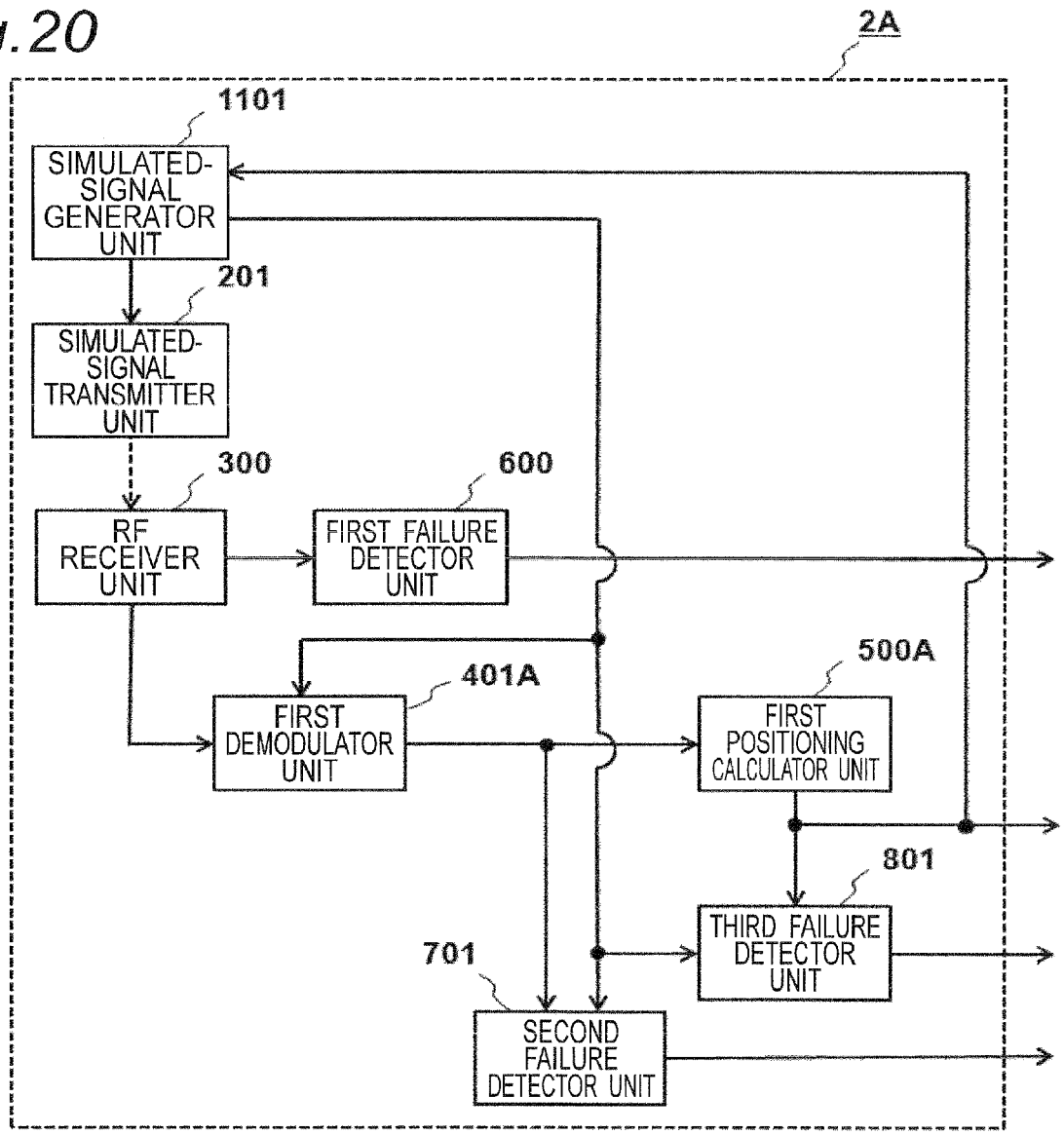
FIG. 20 shows another exemplary configuration of the first positioning receiver unit in the satellite positioning system receiver according to the fifth embodiment of the present invention.

FIG. 18 shows an exemplary configuration of the first positioning receiver unit 2A in the satellite positioning system receiver 1E according to the fifth embodiment of the present invention. The first positioning receiver unit 2A as shown in FIG. 18 is configured by omitting the state determiner unit 901 from the configuration of the satellite positioning system receiver 1B as shown in FIG. 9. In addition, FIG. 19 shows another exemplary configuration of the first positioning receiver unit 2A in the satellite positioning system receiver 1E according to the fifth embodiment of the present invention. The first positioning receiver unit 2A as shown in FIG. 19 is configured by omitting the state determiner unit 901 from the configuration of the satellite positioning system receiver 1C as shown in FIG. 11. In addition, FIG. 20 shows another exemplary configuration of the first positioning receiver unit 2A in the satellite positioning system receiver 1E according to the fifth embodiment of the present invention. The first positioning receiver unit 2A as shown in FIG. 20 is configured by omitting the state determiner unit 901 from the configuration of the satellite positioning system receiver 1D as shown in FIG. 14. It is noted that constituent elements similar to those as shown in FIGS. 9, 11, and 14 are denoted by the same reference signs, and their descriptions are omitted. The second positioning receiver unit 2B also has a configuration similar to that of the first positioning receiver unit 2A.

Figure 21:
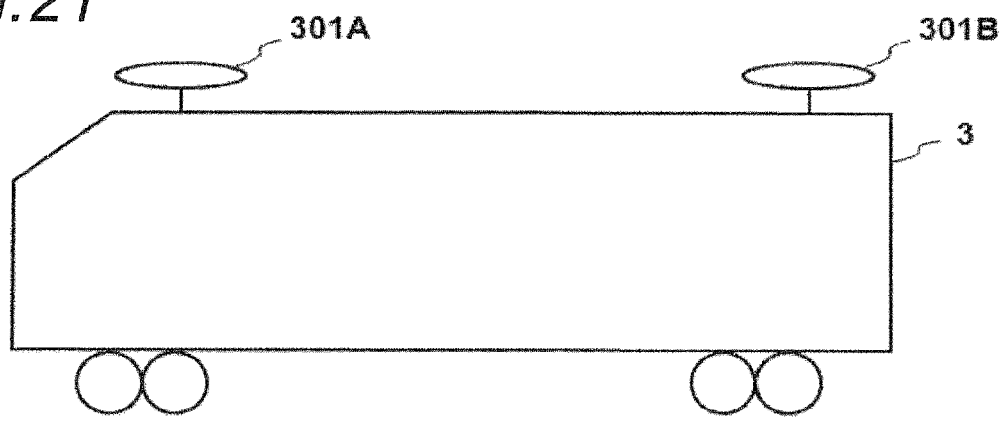
FIG. 21 is a schematic view showing an exemplary installation of a receiving antenna in the satellite positioning system receiver according to the fifth embodiment of the present invention.

FIG. 21 is a schematic view of an exemplary installation of receiving antennas in the satellite positioning system receiver 1E according to the fifth embodiment of the present invention. FIG. 21 shows an example of installing the satellite positioning system receiver 1E according to the present embodiment in a railway vehicle 3. A receiving antenna 301A of the first positioning receiver unit 2A and a receiving antenna 301B of the second positioning receiver unit 2B are installed in the vehicle 3 with a distance therebetween such that dirt does not simultaneously adhere to radomes, and that the receiving antennas 301A and 301B are substantially simultaneously subjected to blocking of radio waves due to a tunnel or blocking material. For example, it may be configured that the receiving antennas 301A and 301B are mounted on the front and rear, or the left and right of the railway vehicle 3, respectively. FIG. 21 shows an example of mounting the receiving antenna 301A on the front of the vehicle 3, and the receiving antenna 301B on the rear of the vehicle 3.

When the vehicle 3 with the receiving antennas 301A and 301B installed therein as shown in FIG. 21 is traveling at a position where radio waves are blocked by a tunnel or building, both the positioning-unavailability signal outputted from the first positioning receiver unit 2A, and the positioning-unavailability signal outputted from the second positioning receiver unit 2B are "1". In addition, when dirt adheres to the radome of the receiving antenna 301A, the positioning-unavailability signal outputted from the first positioning receiver unit 2A is "1", but the positioning-unavailability signal outputted from the second positioning receiver unit 2B is "0".

Next, the state determiner unit 902 is described. The state determiner unit 902 determines whether and where a failure exists in the satellite positioning system receiver 1E, based on the first failure detection signals, the second failure detection signals, and the third failure detection signals, which are outputted from the first positioning receiver unit 2A and the second positioning receiver unit 2B. The state determiner unit 902 includes, for example, an electronic circuit. As another example, the state determiner unit 902 is embodied by executing programs stored in a memory on a processor. The configuration of the memory and the processor is similar to that of FIG. 5. The state determiner unit 902 determines whether and where a failure exists in the satellite positioning system receiver 1E, according to Table 3.

It is noted that, in Table 3, "1" for the first failure detection signal indicates that at least one of the two first failure detection signals outputted from the first positioning receiver unit 2A and the second positioning receiver unit 2B is "1". In addition, in Table 3, "0" for the first failure detection signal indicates that both the two first failure detection signals outputted from the first positioning receiver unit 2A and the second positioning receiver unit 2B are "0". The same also applies to the second failure detection signal and the third failure detection signal.

When all of the first failure detection signal, the second failure detection signal, and the third failure detection signal are "0", the state determiner unit 902 determines that there is no failure location in the satellite positioning system receiver 1E (Types 1 to 4 in Table 3). When the first failure detection signal and the second failure detection signal are "0", and the third failure detection signal is "1", the state determiner unit 902 determines that there is a failure in the positioning calculator unit in the first positioning receiver unit 2A or the second positioning receiver unit 2B (Type 5 in Table 3). When the first failure detection signal is "0", and the second failure detection signal is "1", the state determiner unit 902 determines that there is a failure in the outputted from the first positioning receiver unit 2A, and the positioning-unavailability signal outputted from the second positioning receiver unit 2B are "1", the state determiner unit 902 determines that the receiving environment degrades (Type 4 in Table 3).

TABLE 3

| TYPE | FIRST FAILURE DETECTION SIGNAL | SECOND FAILURE DETECTION SIGNAL | THIRD FAILURE DETECTION SIGNAL | POSITIONING-UNAVAILABILITY SIGNAL FIRST POSITIONING RECEIVER UNIT | POSITIONING-UNAVAILABILITY SIGNAL SECOND POSITIONING RECEIVER UNIT | DECISION RESULT |
|---|---|---|---|---|---|---|
| 1 | 0 | 0 | 0 | 0 | 0 | NO FAILURE LOCATION (NORMAL) |
| 2 | 0 | 0 | 0 | 0 | 1 | NO FAILURE LOCATION (DIRT ON ANTENNA RADOME) |
| 3 | 0 | 0 | 0 | 1 | 0 | NO FAILURE LOCATION (DIRT ON ANTENNA RADOME) |
| 4 | 0 | 0 | 0 | 1 | 1 | NO FAILURE LOCATION (DEGRADED RECEIVING ENVIRONMENT) |
| 5 | 0 | 0 | 1 | — | — | FAILURE IN POSITIONING CALCULATOR UNIT |
| 6 | 0 | 1 | 0 | — | — | FAILURE IN DEMODULATOR UNIT |
| 7 | 0 | 1 | 1 | — | — | FAILURE IN DEMODULATOR UNIT |
| 8 | 1 | 0 | 0 | — | — | FAILURE IN RF RECEIVER UNIT |
| 9 | 1 | 0 | 1 | — | — | FAILURE IN RF RECEIVER UNIT |
| 10 | 1 | 1 | 0 | — | — | FAILURE IN RF RECEIVER UNIT |
| 11 | 1 | 1 | 1 | — | — | FAILURE IN RF RECEIVER UNIT | demodulator unit in the first positioning receiver unit 2A or the second positioning receiver unit 2B (Types 6 and 7 in Table 3). When the first failure detection signal is "1", the state determiner unit 902 determines that there is a failure in the RF receiver unit in the first positioning receiver unit 2A or the second positioning receiver unit 2B (Types 8 to 11 in Table 3). The state determiner unit 902 determines whether and where a failure exists in the satellite positioning system receiver 1E, as described above.

In addition, the state determiner unit 902 also has a function to estimate a reason why the positioning-unavailability signal outputted from the first positioning receiver unit 2A or the second positioning receiver unit 2B is "1", when the positioning-unavailability signal is "1" even though it is determined that there is no failure in the satellite positioning system receiver 1E (Types 2 to 4 in Table 3). When both the positioning-unavailability signal outputted from the first positioning receiver unit 2A, and the positioning-unavailability signal outputted from the second positioning receiver unit 2B are "0", the state determiner unit 902 determines that the satellite positioning system receiver 1E is normal (Type 1 in Table 3).

When the positioning-unavailability signal outputted from the first positioning receiver unit 2A is "0", and the positioning-unavailability signal outputted from the second positioning receiver unit 2B is "1", the state determiner unit 902 determines that dirt adheres to the receiving antenna 301B of the second positioning receiver unit 2B (Type 2 in Table 3). When the positioning-unavailability signal outputted from the first positioning receiver unit 2A is "1", and the positioning-unavailability signal outputted from the second positioning receiver unit 2B is "0", the state determiner unit 902 determines that dirt adheres to the receiving antenna 301A of the first positioning receiver unit 2A (Type 3 in Table 3). When both the positioning-unavailability signal The satellite positioning system receiver 1E according to the present embodiment operates as described above. According to the satellite positioning system receiver 1E of the present embodiment, it is possible to determine whether a failure exists in the satellite positioning system receiver 1E, whether receiving environment of the receiving antennas degrades, and whether dirt on the radome of receiving antennas exists, without using map information. In addition, the satellite positioning system receiver 1E according to the present embodiment also has the same advantageous effects as those described in the first, second, third, and fourth embodiments.

Sixth Embodiment

The satellite positioning system receiver according to the third embodiment is configured to include the test signal generator unit in the simulated-signal generator unit, generate the simulated signal including the test signal, and detect a failure in the RF receiver unit using the test signal. In contrast, a satellite positioning system receiver according to the present embodiment detects a failure in an RF receiver unit, without using a test signal.

Figure 22:
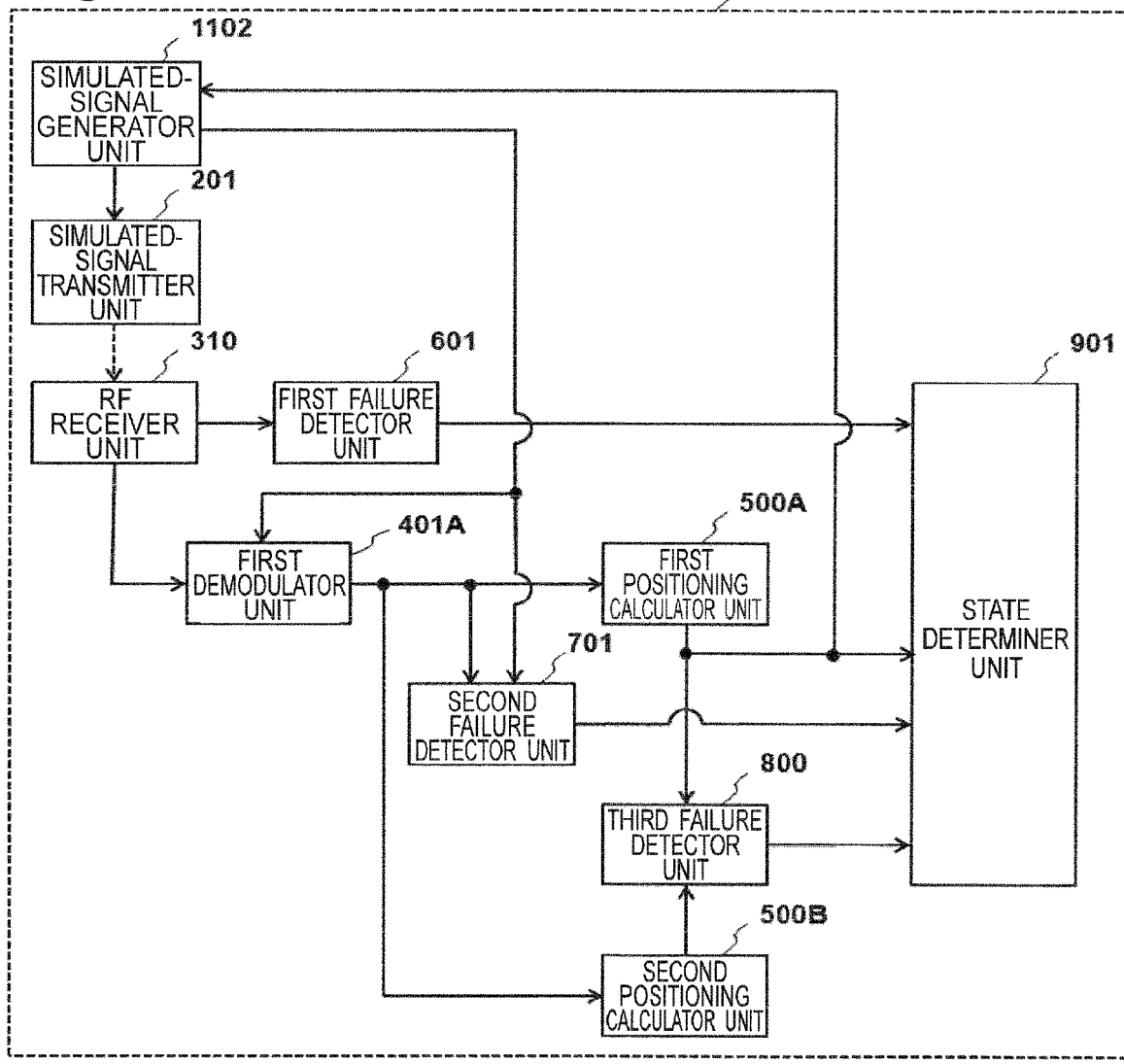
FIG. 22 shows an exemplary configuration of a satellite positioning system receiver according to a sixth embodiment of the present invention.

FIG. 22 shows an exemplary configuration of a satellite positioning system receiver 1F according to a sixth embodiment of the present invention. The satellite positioning system receiver 1F as shown in FIG. 22 is different from the satellite positioning system receiver 1C as shown in FIG. 11 in the following three points. The first difference is that a simulated-signal generator unit 1102 as shown in FIG. 22 has a configuration different from that of the simulated-signal generator unit 1100 as shown in FIG. 11. The second difference is that an RF receiver unit 310 as shown in FIG. 22 has a configuration different from that of the RF receiver unit 300 as shown in FIG. 11. The third difference is that operation of a first failure detector unit 601 as shown in FIG. 22 is different from the operation of the first failure detector unit 600 as shown in FIG. 11. It is noted that constituent elements similar to those as shown in FIG. 11 are denoted by the same reference signs, and their descriptions are omitted.

Figure 23:
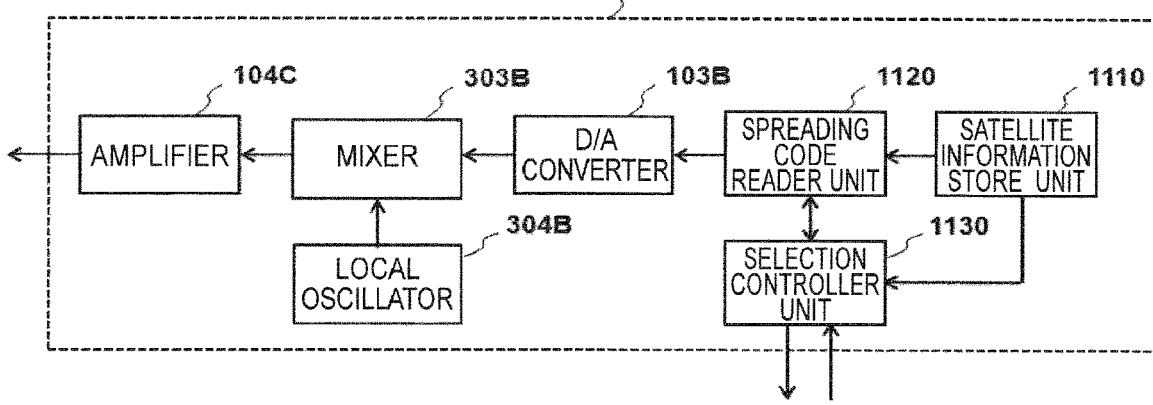
FIG. 23 shows an exemplary configuration of a simulated-signal generator unit in the satellite positioning system receiver according to the sixth embodiment of the present invention.

At first, the simulated-signal generator unit 1102 is described. FIG. 23 shows an exemplary configuration of the simulated-signal generator unit 1102 in the satellite positioning system receiver 1F according to the sixth embodiment of the present invention. The simulated-signal generator unit 1102 includes a satellite information store unit 1110, a spreading code reader unit 1120, a selection controller unit 1130, a D/A converter 103B, a mixer 303B, a local oscillator 304B, and an amplifier 104C. The simulated-signal generator unit 1102 as shown in FIG. 23 is different from the simulated-signal generator unit 1100 as shown in FIG. 12 in the following two points.

The first difference is that the simulated-signal generator unit 1102 as shown in FIG. 23 does not include the test signal generator unit 100. The second difference is that operation of the amplifier 104C as shown in FIG. 23 is different from the operation of the amplifier 104B as shown in FIG. 12. It is noted that constituent elements similar to those as shown in FIG. 12 are denoted by the same reference signs, and their descriptions are omitted. The amplifier 104C as shown in FIG. 23 amplifies the third simulated signal outputted from the mixer 303B, and outputs the amplified signal as the first simulated signal. That is, in the simulated-signal generator unit 1102 according to the present embodiment, the first simulated signal does not include the first test signal.

Figure 24:
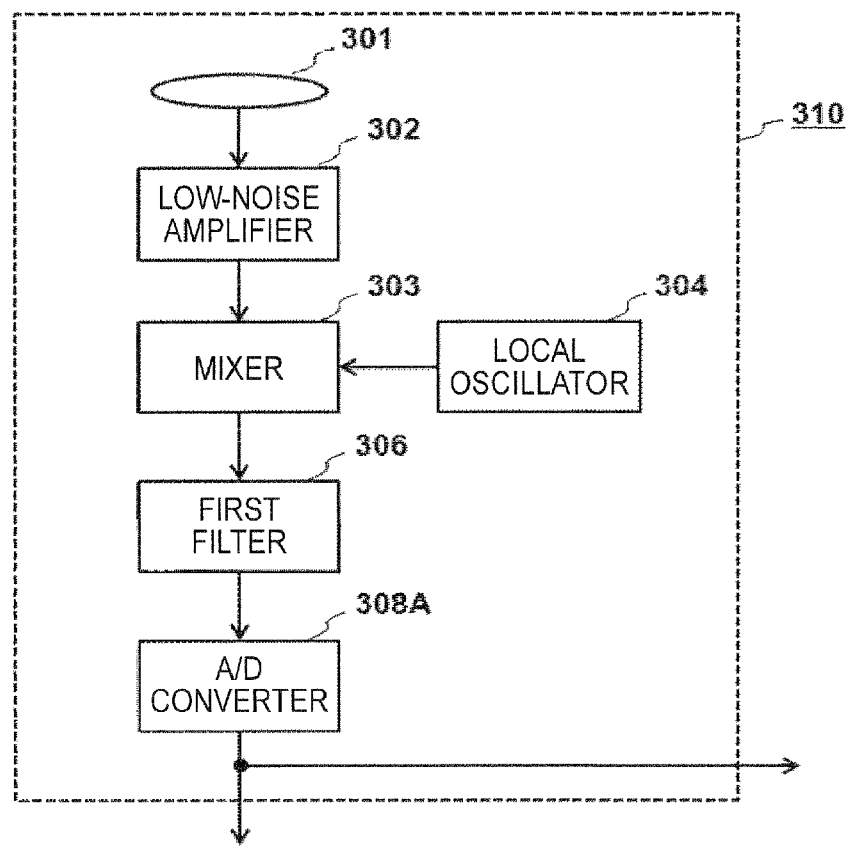
FIG. 24 shows an exemplary configuration of an RF receiver unit in the satellite positioning system receiver according to the sixth embodiment of the present invention.

Next, the RF receiver unit 310 is described. FIG. 24 shows a configuration of the RF receiver unit 310 in the satellite positioning system receiver 1F according to the sixth embodiment of the present invention. The RF receiver unit 310 as shown in FIG. 24 is different from the RF receiver unit 300 as shown in FIG. 3 in that RF receiver unit 310 does not include the signal divider 305, the second filter 307, and the A/D converter 308B. It is noted that constituent elements similar to those as shown in FIG. 3 are denoted by the same reference signs, and their descriptions are omitted. In the RF receiver unit 310 as shown in FIG. 24, the signal outputted from the A/D converter 308A is outputted to the first demodulator unit 401A and the first failure detector unit 601. A digital signal obtained by combining the second satellite signal with the second simulated signal is outputted from the A/D converter 308A.

Next, the first failure detector unit 601 is described. The first failure detector unit 601 diagnoses a failure in the RF receiver unit 310 based on the intensity of a signal outputted from the RF receiver unit 310 in a predetermined frequency band. When the RF receiver unit 310 including the receiving antenna 301 operates normally, the second satellite signal and the second simulated signal are signals whose frequency band is converted from the RF frequency band into the baseband frequency band. Accordingly, the first failure detector unit 601 diagnoses a failure in the RF receiver unit 310 based on the intensity of a signal outputted from the RF receiver unit 310 in the baseband frequency band.

When the intensity of the signal outputted from the RF receiver unit 310 in the baseband frequency band exceeds a predetermined threshold, the first failure detector unit 601 determines that the RF receiver unit 310 is normal. On the other hand, when the intensity of the signal outputted from the RF receiver unit 310 in the baseband frequency band is less than or equal to the predetermined threshold, the first failure detector unit 601 determines that the RF receiver unit 310 is abnormal. Even when the first satellite signal cannot be received due to dirt on a radome or due to the surrounding environment, if the RF receiver unit 310 operates normally, the RF receiver unit 310 outputs the second simulated signal. Accordingly, it is possible to determine whether a failure exists in the RF receiver unit 310, by setting the threshold according to the intensity of the first simulated signal.

Next, the signal intensity of the first simulated signal is described. In general, a first satellite signal emitted from a positioning satellite largely attenuates before arriving the ground. Accordingly, the first satellite signal received by the RF receiver unit 310 is below the noise floor. The noise floor means the intensity of noise in an electronic circuit generated by the electronic circuit itself. The signal intensity of the first simulated signal should be above the noise floor. It is noted that since the satellite used for the first simulated signal is different from the satellite used for measuring the own position, if the intensity of the first simulated signal is above the noise floor, this does not influence ordinary positioning.

According to the satellite positioning system receiver 1F of the present embodiment, it is possible to determine whether a failure exists in the RF receiver unit 310, without using a test signal, thus resulting in a simplified configuration. In addition, the satellite positioning system receiver 1F according to the present embodiment also has the same advantageous effects as those described in the first, second, and third embodiments.

Seventh Embodiment

The satellite positioning system receiver according to the fourth embodiment is configured to include the test signal generator unit in the simulated-signal generator unit, generate the simulated signal including the test signal, and detect a failure in an RF receiver unit using the test signal. In contrast, a satellite positioning system receiver according to the present embodiment detects a failure in an RF receiver unit, without using a test signal.

Figure 25:
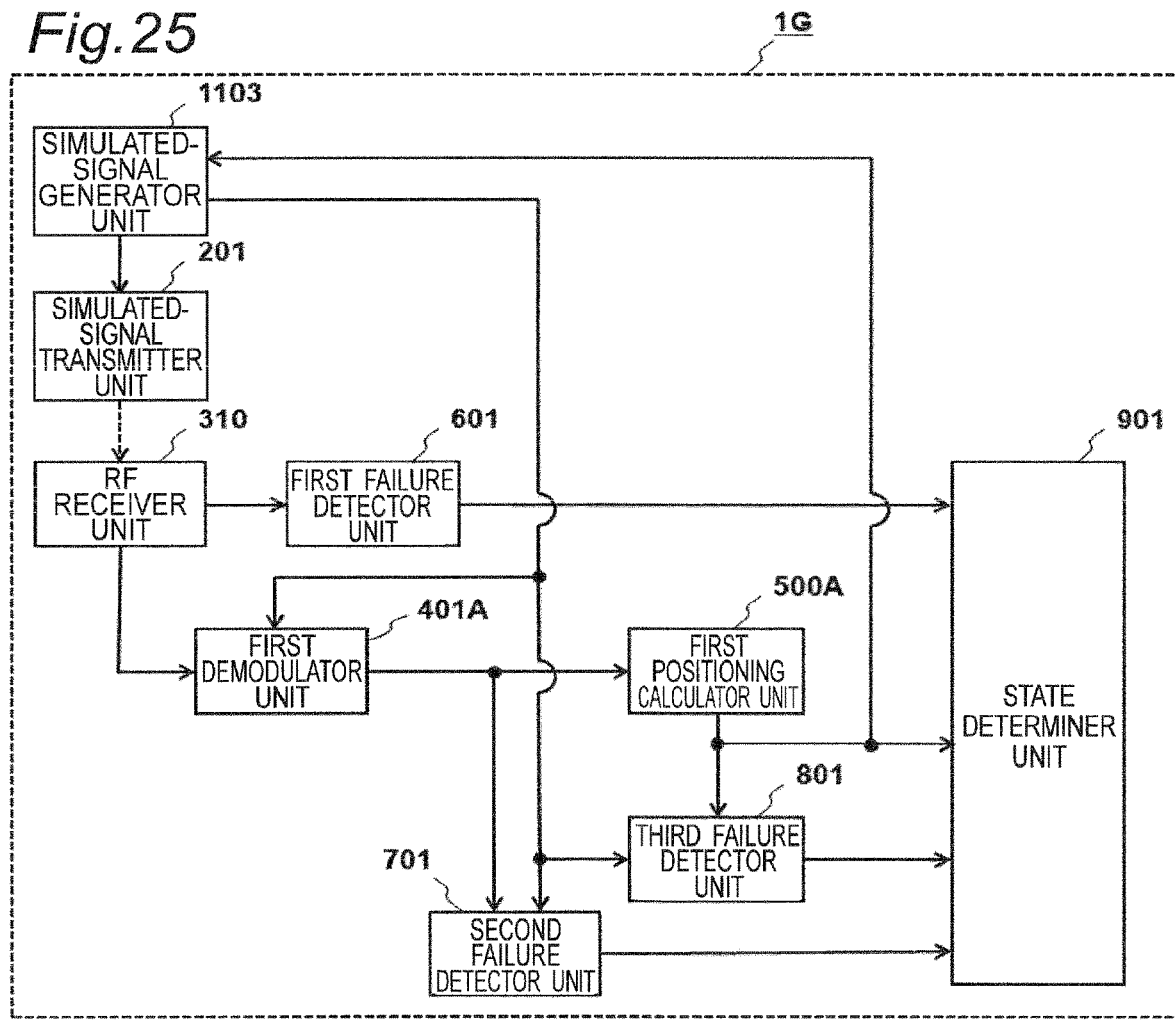
FIG. 25 shows an exemplary configuration of a satellite positioning system receiver according to a seventh embodiment of the present invention.

FIG. 25 shows an exemplary configuration of a satellite positioning system receiver 1G according to a seventh embodiment of the present invention. The satellite positioning system receiver 1G as shown in FIG. 25 is different from the satellite positioning system receiver 1D as shown in FIG. 14 in the following three points. The first difference is that a simulated-signal generator unit 1103 as shown in FIG. 25 has a configuration different from that of the simulated-signal generator unit 1101 as shown in FIG. 14. The second difference is that an RF receiver unit 310 as shown in FIG. 25 has a configuration different from that of the RF receiver unit 300 as shown in FIG. 14. The third difference is that operation of a first failure detector unit 601 as shown in FIG. 25 is different from the operation of the first failure detector unit 600 as shown in FIG. 14. It is noted that constituent elements similar to those as shown in FIG. 14 are denoted by the same reference signs, and their descriptions are omitted. In addition, the RF receiver unit 310 and the first failure detector unit 601 are similar to those as shown in FIG. 22, and thus, descriptions thereof are omitted.

Figure 26:
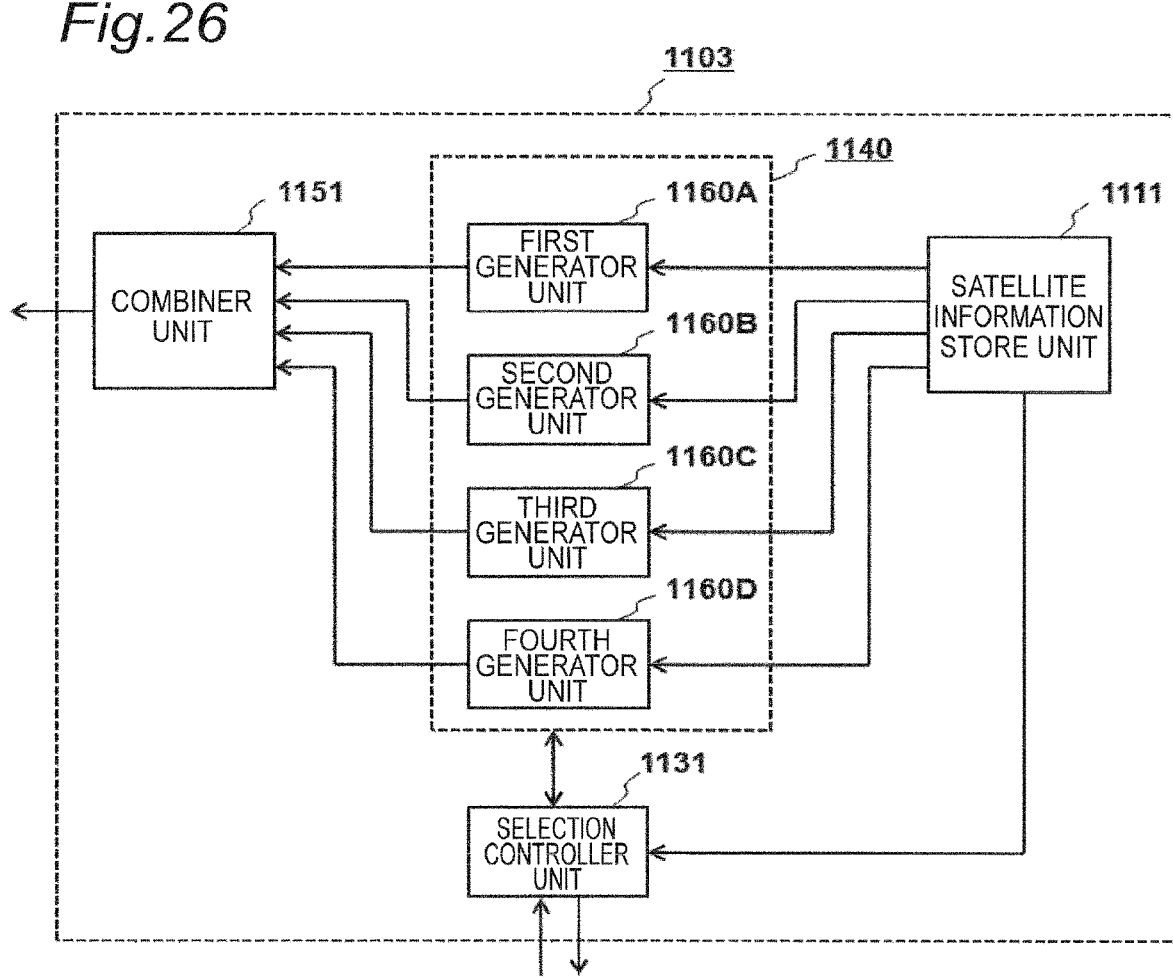
FIG. 26 shows an exemplary configuration of a simulated-signal generator unit in the satellite positioning system receiver according to the seventh embodiment of the present invention.

At first, the simulated-signal generator unit 1103 is described. FIG. 26 shows an exemplary configuration of the simulated-signal generator unit 1103 in the satellite positioning system receiver 1G according to the seventh embodiment of the present invention. The simulated-signal generator unit 1103 includes a satellite information store unit 1111, a selection controller unit 1131, a signal generator unit 1140, and a combiner unit 1151. In addition, the signal generator unit 1140 includes a first generator unit 1160A, a second generator unit 1160B, a third generator unit 1160C, and a fourth generator unit 1160D. The simulated-signal generator unit 1103 as shown in FIG. 26 is different from the simulated-signal generator unit 1101 as shown in FIG. 15 in the following two points.

The first difference is that the simulated-signal generator unit 1103 as shown in FIG. 26 does not include the test signal generator unit 100. The second difference is that operation of the combiner unit 1151 as shown in FIG. 26 is different from that of the combiner unit 1150 as shown in FIG. 15. It is noted that constituent elements similar to those as shown in FIG. 15 are denoted by the same reference signs, and their descriptions are omitted. The combiner unit 1151 as shown in FIG. 26 combines the four third simulated signals outputted from the signal generator unit 1140, to generate the first simulated signal, and outputs the first simulated signal to the simulated-signal transmitter unit 201. That is, in the simulated-signal generator unit 1103 according to the present embodiment, the first simulated signal does not include the first test signal.

The simulated-signal transmitter unit 201 transmits the first simulated signal. Operations of the RF receiver unit 310 and the first failure detector unit 601 are similar to the operations described in the sixth embodiment. In addition, operations of the first demodulator unit 401A, the first positioning calculator unit 500A, the second failure detector unit 701, the third failure detector unit 801, and the state determiner unit 901 are similar to the operations described in the fourth embodiment.

According to the satellite positioning system receiver 1G of the present embodiment, it is possible to determine whether a failure exists in the RF receiver unit 310, without using a test signal, thus resulting in a simplified configuration. In addition, the satellite positioning system receiver 1G according to the present embodiment also has the same advantageous effects as those described in the first, second, third, and fourth embodiments.

REFERENCE SIGNS LIST

1A, 1B, 1C, 1D, 1E, 1F: SATELLITE POSITIONING SYSTEM RECEIVER
2A: FIRST POSITIONING RECEIVER UNIT
2B: SECOND POSITIONING RECEIVER UNIT
3: VEHICLE
100: TEST SIGNAL GENERATOR UNIT
101: WAVEFORM MEMORY
102: DATA READER UNIT
103, 103B: D/A CONVERTER
104, 104B, 104C: AMPLIFIER
200: TEST SIGNAL TRANSMITTER UNIT
201: SIMULATED-SIGNAL TRANSMITTER UNIT
300, 310: RF RECEIVER UNIT
301, 301A, 301B: RECEIVING ANTENNA
302: LOW-NOISE AMPLIFIER
303, 303B: MIXER
304, 304B: LOCAL OSCILLATOR
305: SIGNAL DIVIDER
306: FIRST FILTER
307: SECOND FILTER
308A, 308B: A/D CONVERTER
400A, 401A: FIRST DEMODULATOR UNIT
400B: SECOND DEMODULATOR UNIT
410, 411: CONTROLLER UNIT
420: DEMODULATOR CIRCUIT
430A: FIRST CHANNEL
430B: SECOND CHANNEL
430C: THIRD CHANNEL
430D: FOURTH CHANNEL
431: CODE GENERATOR UNIT
432: CORRELATION CALCULATOR UNIT
500A: FIRST POSITIONING CALCULATOR UNIT
500B: SECOND POSITIONING CALCULATOR UNIT
600, 601: FIRST FAILURE DETECTOR UNIT
610: FREQUENCY ANALYZER UNIT
620: DECISION MAKING UNIT
700, 701: SECOND FAILURE DETECTOR UNIT
800, 801: THIRD FAILURE DETECTOR UNIT
900, 901, 902: STATE DETERMINER UNIT
910: MAP INFORMATION STORE UNIT
920, 921: FAILURE LOCATOR UNIT
930: OWN-POSITION STORE UNIT
1001: PROCESSOR
1002: MEMORY
1003: DATA BUS
1100, 1101, 1102, 1103: SIMULATED-SIGNAL GENERATOR UNIT
1110, 1111: SATELLITE INFORMATION STORE UNIT
1120: SPREADING CODE READER UNIT
1130, 1131: SELECTION CONTROLLER UNIT
1140: SIGNAL GENERATOR UNIT
1150, 1151: COMBINER UNIT
1160A: FIRST GENERATOR UNIT
1160B: SECOND GENERATOR UNIT
1160C: THIRD GENERATOR UNIT
1160D: FOURTH GENERATOR UNIT
1161: MESSAGE READER UNIT
1162: MODULATOR
1163: DELAY UNIT

The invention claimed is:

1. A satellite positioning system receiver, comprising:
a test signal generator that generates a first test signal having a frequency in an RF frequency band;
a test signal transmitter that transmits the first test signal;
an RF receiver that receives the first test signal and a first satellite signal transmitted from a satellite, through a receiving antenna, and generates a second test signal and a second satellite signal, respectively, each of the second test signal and the second satellite signal having a frequency in a baseband frequency band;
a first demodulator that calculates a first correlation value between the second satellite signal and a spreading code allocated per satellite, to acquire a first identifier of a satellite transmitting the first satellite signal;
a second demodulator that calculates a second correlation value between the second satellite signal and the spreading code, to acquire a second identifier of the satellite transmitting the first satellite signal;
a positioning calculator that calculates an own position using the first correlation value;
a first failure detector that compares signal intensity of the second test signal with a predetermined threshold to generate a first failure detection signal indicating whether a failure condition exists in the RF receiver;
a second failure detector that compares the first identifier to the second identifier to generate a second failure detection signal indicating whether at least one of the first and second demodulations is in a failure state; and
a state determiner that determines whether and where a failure exists, using the first failure detection signal and the second failure detection signal.

2. The satellite positioning system receiver as claimed in claim 1, comprising a third failure detector, wherein the positioning calculator further includes a first positioning calculator that calculates a first own position using the first correlation value, and a second positioning calculator that calculates a second own position using the second correlation value, wherein the third failure detector compares the first own position with the second own position to generate a third failure detection signal, and wherein the state determiner determines whether and where the failure exists using the first failure detection signal, the second failure detection signal, and the third failure detection signal.

3. The satellite positioning system receiver as claimed in claim 1, wherein the test signal transmitter further includes a signal line arranged close to the receiving antenna, and transmits the first test signal to the receiving antenna using weak electrical coupling between the signal line and the receiving antenna.

4. A satellite positioning system receiver, comprising:
a simulated-signal generator that generates a first simulated signal that simulates a satellite signal transmitted from a satellite, having a first identifier, traveling at a predetermined position;
a simulated-signal transmitter that transmits the first simulated signal;
an RF receiver that receives the first simulated signal and a first satellite signal transmitted from a satellite, through a receiving antenna, and generates a second simulated signal and a second satellite signal, respectively, each of the second simulated signal and the second satellite signal having a frequency in a baseband frequency band;
a demodulator that calculates a correlation value between the second simulated signal and a spreading code allocated per satellite, to acquire a second identifier of the satellite simulated by the simulated-signal generator, and calculates a correlation value between the second satellite signal and the spreading code allocated per satellite, to acquire a satellite transmitting the first satellite signal;
a positioning calculator that calculates an own position using the correlation value between the second satellite signal and the spreading code;
a first failure detector that compares signal intensity of the second simulated signal with a predetermined threshold to generate a first failure detection signal indicating whether a failure condition exists in the RF receiver;
a second failure detector that determines whether the satellite simulated by the simulated-signal generator is acquired by the demodulator by comparing the first and second identifiers, to generate a second failure detection signal; and
a state determiner that determines whether and where a failure exists, using the first failure detection signal and the second failure detection signal.

5. The satellite positioning system receiver as claimed in claim 4,
wherein a frequency band of the first simulated signal includes a first test signal, and
wherein the first failure detector compares signal intensity of the second simulated signal in a frequency band determined according to a frequency band including the first test signal, with a predetermined threshold, to generate the first failure detection signal.

6. The satellite positioning system receiver as claimed in claim 4, wherein the predetermined position is a position which cannot be acquired by the demodulator at the own position.

7. The satellite positioning system receiver as claimed in claim 4, comprising a third failure detector,
wherein the positioning calculator further includes a first positioning calculator that calculates a first own position and a second positioning calculator that calculates a second own position,
wherein the third failure detector compares the first own position with the second own position to generate a third failure detection signal, and
wherein the state determiner determines whether and where the failure exists using the first failure detection signal, the second failure detection signal, and the third failure detection signal.

8. The satellite positioning system receiver as claimed in claim 4, comprising a third failure detector,
wherein the simulated-signal generator selects at least four satellites, and generates a first simulated signal that simulates satellite signals transmitted from the selected satellites and received at a reference position;
wherein, when conducting failure diagnosis, the positioning calculator calculates an own position for failure diagnosis using a correlation value between the second simulated signal and the spreading code,
wherein the third failure detector compares the own position for failure diagnosis with the reference position to generate a third failure detection signal, and
wherein the state determiner further determines whether and where the failure exists using the first failure detection signal, the second failure detection signal, and the third failure detection signal.

9. The satellite positioning system receiver as claimed in claim 4, wherein the simulated-signal transmitter further includes a signal line arranged close to the receiving antenna, and transmits the first simulated signal to the receiving antenna using weak electrical coupling between the signal line and the receiving antenna.

10. The satellite positioning system receiver as claimed in claim 1, wherein the state determiner further includes
a map information memory that stores a radio-wave blocking position where the first satellite signal is blocked, and
an own-position memory that stores the own position latest calculated by the positioning calculator, and
wherein, when the positioning calculator cannot calculate the own position, the state determiner compares the radio-wave blocking position with the own position, to determine a reason why the positioning calculator cannot calculate the own position.

11. The satellite positioning system receiver as claimed in claim 10,
wherein the state determiner further determines that a receiving environment of the first satellite signal degrades, when the own position is within a predetermined range from the radio-wave blocking position, and further determines that dirt adheres to a radome of the receiving antenna, when the own position is out of the predetermined range from the radio-wave blocking position.

12. The satellite positioning system receiver as claimed in claim 1, wherein a frequency band of the first test signal is different from a frequency band of the first satellite signal.

13. A satellite positioning system receiver, comprising:
two positioning receivers, and
one state determiner, wherein each of the positioning receivers includes
a test signal generator that generates a first test signal having a frequency in an RF frequency band,
a test signal transmitter that transmits the first test signal,
an RF receiver that receives the first test signal and a first satellite signal transmitted from a satellite, through a receiving antenna, and generates a second test signal and a second satellite signal, respectively, each of the second test signal and the second satellite signal having a frequency in a baseband frequency band,
a first demodulator that calculates a first correlation value between the second satellite signal and a spreading code allocated per satellite, to acquire a first identifier of a satellite transmitting the first satellite signal,
a second demodulator that calculates a second correlation value between the second satellite signal and the spreading code, to acquire a second identifier of the satellite transmitting the first satellite signal,
a positioning calculator that calculates an own position using the first correlation value, and outputs a positioning-unavailability signal notifying whether the own position has been calculated,
a first failure detector that compares signal intensity of the second test signal with a predetermined threshold to generate a first failure detection signal indicating whether a failure condition exists in the RF receiver, and
a second failure detector that compares the first identifier to the second identifier to generate a second failure detection signal indicating whether at least one of the first and second demodulations is in a failure state, and
wherein the state determiner determines whether and where a failure exists, and when the positioning calculator cannot calculate the own position, determines a reason why the positioning calculator cannot calculate the own position, using the first failure detection signal, the second failure detection signal, and the positioning-unavailability signal which are outputted from the two positioning receivers.

14. The satellite positioning system receiver as claimed in claim 4, wherein the state determiner further includes
a map information memory that stores a radio-wave blocking position where the first satellite signal is blocked, and
an own-position memory that stores the own position latest calculated by the positioning calculator, and
wherein, when the positioning calculator cannot calculate the own position, the state determiner compares the radio-wave blocking position with the own position to determine a reason why the positioning calculator cannot calculate the own position.

15. The satellite positioning system receiver as claimed in claim 14, wherein the state determiner further determines that a receiving environment of the first satellite signal degrades, when the own position is within a predetermined range from the radio-wave blocking position, and further determines that dirt adheres to a radome of the receiving antenna, when the own position is out of the predetermined range from the radio-wave blocking position.

16. The satellite positioning system receiver as claimed in claim 5,
wherein a frequency band of the first test signal is different from a frequency band of the first satellite signal.

* * * * *